US008176630B2

(12) United States Patent
Kataoka et al.

(10) Patent No.: US 8,176,630 B2

(45) Date of Patent: May 15, 2012

(54) METHOD OF PRODUCING LIQUID DROPLET EJECTION HEAD

(75) Inventors: Masaki Kataoka, Kanagawa (JP); Hideki Fukunaga, Kanagawa (JP); Hiroshi Inoue, Kanagawa (JP); Yuji Nishimura, Kanagawa (JP); Susumu Hirakata, Kanagawa (JP); Atsumichi Imazeki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 12/815,493

(22) Filed: Jun. 15, 2010

(65) Prior Publication Data

US 2010/0252528 A1 Oct. 7, 2010

Related U.S. Application Data

(62) Division of application No. 11/703,298, filed on Feb. 7, 2007, now Pat. No. 7,798,628.

(30) Foreign Application Priority Data

Jul. 3, 2006 (JP) ................................ 2006-183639

(51) Int. Cl.
*B21D 53/76* (2006.01)
*B23P 17/00* (2006.01)
*B41J 2/015* (2006.01)
*B41J 2/15* (2006.01)
*B41J 2/145* (2006.01)

(52) U.S. Cl. ............................ 29/890.1; 347/20; 347/40

(58) Field of Classification Search ................. 29/890.1; 347/20, 40, 44, 45, 65

See application file for complete search history.

(56) References Cited

U.S. PATENT DOCUMENTS 3,522,885 A * 8/1970 Lavender et al. ........ 210/321.73
3,839,204 A * 10/1974 Ingenito et al. ............... 210/181
3,892,533 A * 7/1975 Freedman et al. .............. 422/48
3,894,954 A * 7/1975 Serur ....................... 210/321.72
3,927,981 A * 12/1975 Viannay et al. ................. 422/48
3,977,976 A * 8/1976 Spaan et al. ............. 210/321.68
4,008,047 A * 2/1977 Petersen .......................... 422/48
4,124,478 A * 11/1978 Tsien et al. ................... 204/255
4,176,069 A * 11/1979 Metz et al. ............... 210/321.75
4,191,182 A * 3/1980 Popovich et al. ............ 604/6.01
4,229,290 A * 10/1980 Raj .............................. 210/646
4,304,010 A * 12/1981 Mano ........................... 623/1.46
4,306,318 A * 12/1981 Mano et al. .................. 623/1.33
4,323,455 A * 4/1982 Tanaka et al. ............ 210/321.75
4,332,035 A * 6/1982 Mano ........................... 623/66.1
4,355,426 A * 10/1982 MacGregor .................... 623/1.4
4,474,851 A * 10/1984 Urry ............................ 428/373
4,550,447 A * 11/1985 Seiler et al. .................. 623/1.32

(Continued)

FOREIGN PATENT DOCUMENTS

JP 2002-307676 10/2002

(Continued)

*Primary Examiner* — David Angwin

(74) *Attorney, Agent, or Firm* — Fildes & Outland, P.C.

(57) ABSTRACT

A liquid droplet ejection head includes: a nozzle plate that has a plurality of nozzles ejecting a liquid droplet; a flow path member that includes: pressure generating chambers that communicate with the nozzles; and liquid supply paths through which liquid is supplied to the pressure generating chambers; and a damper portion that is disposed in at least one part of a region, the region being on the nozzle plate, corresponding to the liquid supply paths, the damper portion reducing a fluctuation of an ejection amount of the liquid droplets to enable stable ejection.

13 Claims, 19 Drawing Sheets

U.S. PATENT DOCUMENTS 4,636,309 A * 1/1987 Bellhouse ................ 210/321.72
4,666,668 A * 5/1987 Lidorenko et al. .............. 422/48
4,715,955 A * 12/1987 Friedman ...................... 210/346
5,034,188 A * 7/1991 Nakanishi et al. .............. 422/46
5,043,073 A * 8/1991 Brunner et al. ............... 210/646
5,110,548 A * 5/1992 Montevecchi .................. 422/48
5,225,161 A * 7/1993 Mathewson et al. ............ 422/46
5,230,693 A * 7/1993 Williams et al. ............. 623/1.41
5,263,924 A * 11/1993 Mathewson ................. 604/6.14
5,316,724 A * 5/1994 Mathewson et al. ............ 422/48
5,443,950 A * 8/1995 Naughton et al. ............. 435/1.1
5,518,680 A * 5/1996 Cima et al. .................... 264/401
5,601,727 A * 2/1997 Bormann et al. ............. 210/767
5,626,759 A * 5/1997 Krantz et al. ................. 210/645
5,651,900 A * 7/1997 Keller et al. .................... 216/56
5,695,717 A * 12/1997 Polaschegg et al. ............ 422/48
5,770,417 A * 6/1998 Vacanti et al. ................ 435/180
5,938,923 A * 8/1999 Tu et al. ........................ 210/490
6,039,897 A * 3/2000 Lochhead et al. ........... 264/1.24
6,099,557 A * 8/2000 Schmitt .......................... 623/1.1
6,136,212 A * 10/2000 Mastrangelo et al. .......... 216/49
6,139,574 A * 10/2000 Vacanti et al. ............... 623/1.44
6,143,293 A * 11/2000 Weiss et al. .................. 424/93.7
6,193,360 B1 * 2/2001 Nishiwaki et al. .............. 347/70
6,245,566 B1 * 6/2001 Gearhart et al. .............. 435/384
6,258,271 B1 * 7/2001 Jitariouk et al. ......... 210/500.23
6,328,789 B1 * 12/2001 Spranger ......................... 96/179
6,361,149 B1 * 3/2002 Abe ............................... 347/55
6,454,924 B2 * 9/2002 Jedrzejewski et al. ........ 204/601
6,455,311 B1 * 9/2002 Vacanti ......................... 435/395
6,468,312 B1 * 10/2002 Rennebeck et al. ....... 623/23.64
6,517,571 B1 * 2/2003 Brauker et al. .............. 623/1.13
6,550,132 B1 * 4/2003 Tatsumi .......................... 29/611
6,586,246 B1 * 7/2003 Yoon et al. .................... 435/396
6,637,437 B1 * 10/2003 Hungerford et al. .......... 128/898
6,649,058 B1 * 11/2003 Jitariouk et al. ......... 210/321.75
6,726,711 B1 * 4/2004 Langenbach et al. ...... 623/23.68
6,729,352 B2 * 5/2004 O'Connor et al. ............ 137/827
6,730,516 B2 * 5/2004 Jedrzejewski et al. .......... 436/43
6,743,636 B2 * 6/2004 Chung et al. .................. 436/100
6,752,966 B1 * 6/2004 Chazan ......................... 422/503
6,793,677 B2 * 9/2004 Ferree ........................ 623/17.11
6,805,420 B2 * 10/2004 Sumi ............................... 347/10
6,814,753 B2 * 11/2004 Schmitt ........................ 623/1.44
6,878,271 B2 * 4/2005 Gilbert et al. ............ 210/321.61
6,893,666 B2 * 5/2005 Spievack ....................... 424/551
6,900,021 B1 * 5/2005 Harrison et al. ............. 435/7.21
6,918,886 B1 * 7/2005 Baurmeister ................ 604/6.09
6,932,951 B1 * 8/2005 Losey et al. ................... 422/211
6,939,377 B2 * 9/2005 Jayaraman et al. .......... 623/1.46
6,942,879 B2 * 9/2005 Humes .......................... 424/529
6,946,143 B2 * 9/2005 Kim et al. ..................... 424/443
6,977,223 B2 * 12/2005 George et al. ................ 438/676
6,986,735 B2 * 1/2006 Abraham et al. ............... 600/36
6,991,628 B2 * 1/2006 Vito et al. ......................... 606/1
6,993,406 B1 * 1/2006 Cesarano et al. ............. 700/119
7,087,431 B2 * 8/2006 Wu et al. ....................... 435/395
7,094,379 B2 * 8/2006 Fouillet et al. ................ 422/504
7,122,371 B1 * 10/2006 Ma ............................ 435/297.1
7,143,900 B2 * 12/2006 Hernandez .................... 210/498
7,159,315 B2 * 1/2007 Takahashi et al. ........... 29/890.1
7,166,464 B2 * 1/2007 McAllister et al. ........... 435/395
7,174,282 B2 * 2/2007 Hollister et al. .................. 703/2
7,175,658 B1 * 2/2007 Flugelman ................... 623/1.41
7,201,917 B2 * 4/2007 Malaviya et al. ............. 424/423
7,244,272 B2 * 7/2007 Dubson et al. ............... 623/1.44
7,309,540 B2 * 12/2007 Wang ............................ 429/457
7,316,822 B2 * 1/2008 Binette et al. ................. 424/549
7,323,143 B2 * 1/2008 Anderson et al. ............. 422/502
7,348,175 B2 * 3/2008 Vilendrer et al. .......... 435/284.1
7,354,702 B2 * 4/2008 Dai et al. ....................... 435/1.3
7,371,400 B2 * 5/2008 Borenstein et al. ........... 424/423
7,413,712 B2 * 8/2008 Liu et al. ....................... 422/504
7,416,884 B2 * 8/2008 Gemmiti et al. ........... 435/293.1
7,445,926 B2 * 11/2008 Mathies et al. ............ 435/288.5
7,507,380 B2 * 3/2009 Chang et al. .................. 422/129
7,507,579 B2 * 3/2009 Boccazzi et al. ........... 435/297.5
7,517,453 B2 * 4/2009 Bitensky et al. ........... 210/321.6
7,569,127 B1 * 8/2009 Cho ......................... 204/403.01
7,594,714 B2 * 9/2009 Katayama ....................... 347/68
7,681,999 B2 * 3/2010 Ito et al. .......................... 347/71
7,727,399 B2 * 6/2010 Leonard et al. ............... 210/643
7,731,341 B2 * 6/2010 Trauernicht et al. ............ 347/73
7,789,493 B2 * 9/2010 Chung et al. .................... 347/68
7,790,028 B1 * 9/2010 Weinberg et al. .......... 210/321.6
7,798,628 B2 * 9/2010 Kataoka et al. ................. 347/94
7,837,379 B2 * 11/2010 Fiering et al. ............. 366/181.5
2002/0012616 A1 * 1/2002 Zhou et al. .................... 422/130
2002/0098472 A1 * 7/2002 Erlach et al. ...................... 435/4
2002/0173033 A1 * 11/2002 Hammerick et al. ...... 435/305.2
2002/0182241 A1 * 12/2002 Borenstein et al. ........... 424/422
2002/0196315 A1 * 12/2002 Isono et al. ..................... 347/71
2003/0003575 A1 * 1/2003 Vacanti et al. ................ 435/371
2003/0049839 A1 * 3/2003 Romero-Ortega et al. ... 435/397
2003/0119184 A1 * 6/2003 Humes .......................... 435/369
2003/0180711 A1 * 9/2003 Turner et al. ...................... 435/4
2003/0231981 A1 * 12/2003 Johnson et al. ................. 422/44
2004/0057869 A1 * 3/2004 Dingley .......................... 422/48
2004/0077075 A1 * 4/2004 Jensen et al. ............... 435/297.2
2004/0089357 A1 * 5/2004 Dube et al. .................... 137/884
2004/0149688 A1 * 8/2004 Fuchs et al. ..................... 216/56
2004/0168982 A1 * 9/2004 Bitensky et al. .............. 210/649
2005/0008675 A1 * 1/2005 Bhatia et al. .................. 424/426
2005/0037471 A1 * 2/2005 Liu et al. ...................... 435/91.2
2005/0129580 A1 * 6/2005 Swinehart et al. ............ 422/100
2005/0148064 A1 * 7/2005 Yamakawa et al. ........ 435/287.2
2005/0202557 A1 * 9/2005 Borenstein et al. ........... 435/369
2005/0238687 A1 * 10/2005 Humes .......................... 424/423
2006/0136182 A1 * 6/2006 Vacanti et al. .................. 703/11
2006/0195179 A1 * 8/2006 Sun et al. ..................... 623/1.54
2006/0275270 A1 * 12/2006 Warren et al. ................ 424/93.7
2006/0278580 A1 * 12/2006 Striemer et al. .............. 210/650
2007/0048727 A1 * 3/2007 Shuler et al. ................... 435/1.2
2007/0086918 A1 * 4/2007 Hartley et al. .................. 422/73
2007/0128244 A1 * 6/2007 Smyth ........................... 424/423
2007/0139451 A1 * 6/2007 Somasiri et al. .............. 346/138
2007/0217964 A1 * 9/2007 Johnson et al. ............... 422/130
2007/0231783 A1 * 10/2007 Prabhakarpandian et al. ... 435/4
2007/0266801 A1 * 11/2007 Khademhosseini et al. .......................... 73/863.91
2007/0281353 A1 * 12/2007 Vacanti et al. ................ 435/367
2008/0026464 A1 * 1/2008 Borenstein et al. ........... 435/395
2008/0051696 A1 * 2/2008 Curtin et al. .................... 604/29
2008/0093298 A1 * 4/2008 Browning et al. ............ 210/646
2009/0060797 A1 * 3/2009 Mathies et al. ............... 422/103
2009/0181200 A1 * 7/2009 Borenstein et al. .......... 428/36.9
2009/0316972 A1 * 12/2009 Borenstein et al. ........... 382/131
2010/0022936 A1 * 1/2010 Gura et al. ................... 604/6.07
2010/0198131 A1 * 8/2010 Leonard et al. .............. 604/5.04
2010/0326914 A1 * 12/2010 Drost et al. ................... 210/644
2011/0024346 A1 * 2/2011 Weinberg et al. ........ 210/321.72
2011/0082563 A1 * 4/2011 Charest et al. ............. 623/23.65
2011/0105982 A1 * 5/2011 Leonard et al. .............. 604/6.01

FOREIGN PATENT DOCUMENTS

JP 3402349 2/2003
JP 2006-044132 2/2006
JP 2006-051640 2/2006

* cited by examiner

METHOD OF PRODUCING LIQUID DROPLET EJECTION HEAD

CROSS-REFERENCE TO RELATED APPLICATIONS

This application is a division of U.S. application Ser. No. 11/703,298 filed Feb. 7, 2007, which is based on and claims priority under 35 U.S.C. 119 from Japanese Patent Application No. 2006-183639 filed Jul. 3, 2006.

BACKGROUND

1. Technical Field

The present invention relates to a liquid droplet ejection head, an apparatus for ejecting liquid droplet, and a method of producing a liquid droplet ejection head, and more particularly to a liquid droplet ejection head in which variation of the ejection amount of liquid droplets can be absorbed to enable stable ejection and printing of high quality, and which is simple and economical, an apparatus for ejecting liquid droplet, and a method of producing such a liquid droplet ejection head.

2. Related Art

An inkjet head comprising nozzles for ejecting an ink, pressure generating chambers communicating with the nozzles, and an ink supply path for supplying the ink to plural pressure generating chambers is used. In such an inkjet head, when the ejection amount of liquid droplets is largely varied as a whole, there arises a problem in that the ejection state immediately after the variation of the ejection amount of liquid droplets is disturbed by the inertia force (inertance) of the ink in the ink supply path. In order to prevent the problem from arising, a configuration is known in which a damper function is provided in a branch portion of an ink supply path.

SUMMARY

According to an aspect of the present invention, a liquid droplet ejection head comprising: a nozzle plate that has a plurality of nozzles ejecting a liquid droplet; a flow path member that comprises: pressure generating chambers that communicate with the nozzles; and liquid supply paths through which liquid is supplied to the pressure generating chambers; and a damper portion that is disposed in at least one part of a region, the region being on the nozzle plate, corresponding to the liquid supply paths, the damper portion reducing a fluctuation of an ejection amount of the liquid droplets to enable stable ejection.

BRIEF DESCRIPTION OF THE DRAWINGS

Exemplary embodiment of the present invention will be described in detail based on the following figures, wherein:

FIG. 4A is a plan view, FIG. 4B is a section view taken along the line C-C in FIG. 4A.

FIG. 5A is a section view showing joining of plates, FIG. 5B is a section view showing etching of a plate for a flow path member, FIG. 5C is a section view showing formation of a water-repellent film, and FIG. 5D is a section view showing processing of a nozzle;

FIG. 6A is a plan view, FIG. 6B is a section view taken along the line E-E in FIG. 6A, FIG. 6C is a section view taken along the line F-F in FIG. 6A, and FIG. 6D is a section view taken along the line G-G in FIG. 6A;

FIG. 7A is a plan view, FIG. 7B is a section view taken along the line H-H in FIG. 7A, and FIG. 7C is a section view taken along the line I-I in FIG. 7A;

FIG. 8A is a plan view, FIG. 8B is a section view taken along the line J-J in FIG. 8A, and FIG. 8C is a section view taken along the line K-K in FIG. 8A;

FIG. 9A is a plan view, FIG. 9B is a section view taken along the line M-M in FIG. 9A, FIG. 9C is a section view taken along the line N-N in FIG. 9A, and FIG. 9D is a section view taken along the line O-O in FIG. 9A;

FIG. 11A is a plan view, FIG. 11B is a section view taken along the line P-P in FIG. 11A, FIG. 11C is a section view taken along the line Q-Q in FIG. 11A, and FIG. 11D is a section view taken along the line R-R in FIG. 11A;

FIG. 13A is a plan view, FIG. 13B is a section view taken along the line S-S in FIG. 13A, and FIG. 13C is a section view taken along the line T-T in FIG. 13A;

FIG. 14 shows a damper portion in a seventh embodiment.

FIG. 16A is a plan view, FIG. 16B is a section view taken along the line X-X in FIG. 16A, FIG. 16C is a section view taken along the line Y-Y in FIG. 16A, and FIG. 16D is a section view taken along the line Z-Z in FIG. 16A;

FIG. 18A is a section view showing application of a photosensitive resin, FIG. 18B is a section view showing exposure in which a mask of a photosensitive resin is used, FIG. 18C is a section view showing formation of a step by development, and FIG. 18D is a section view showing formation of a nozzle.

DETAILED DESCRIPTION

First Embodiment (Configuration of Liquid Droplet Ejection Head)

Figure 1:
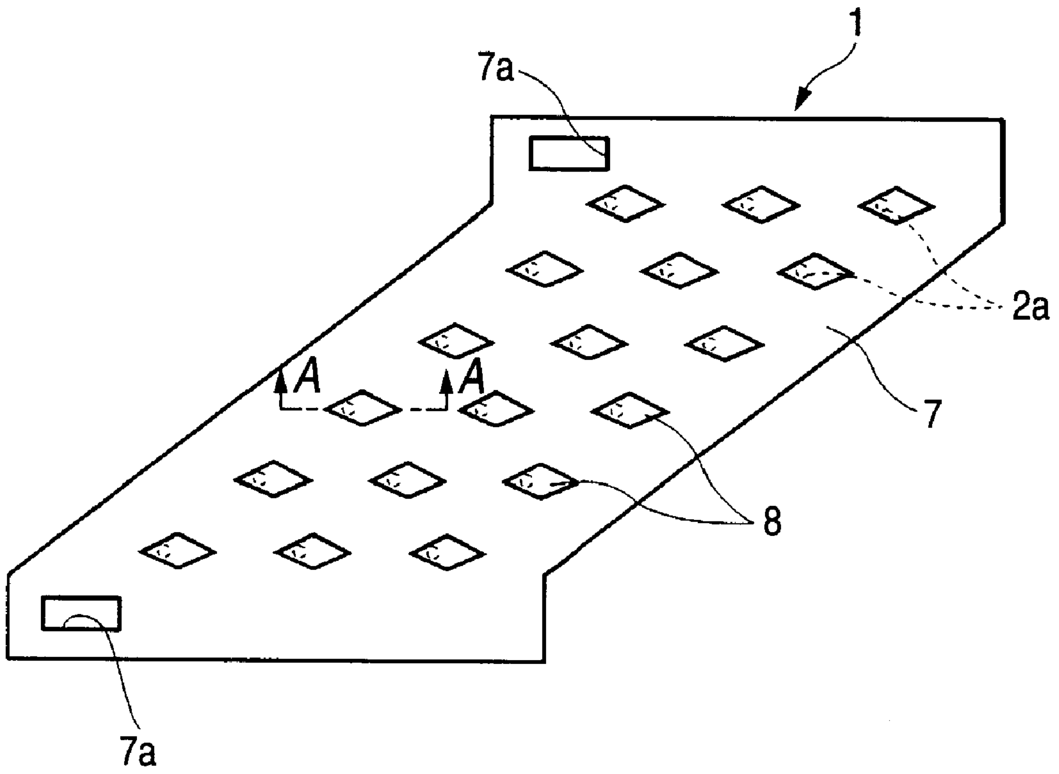
FIG. 1 is a plan view of a liquid droplet ejection head of a first embodiment of the invention.
Figure 2A:
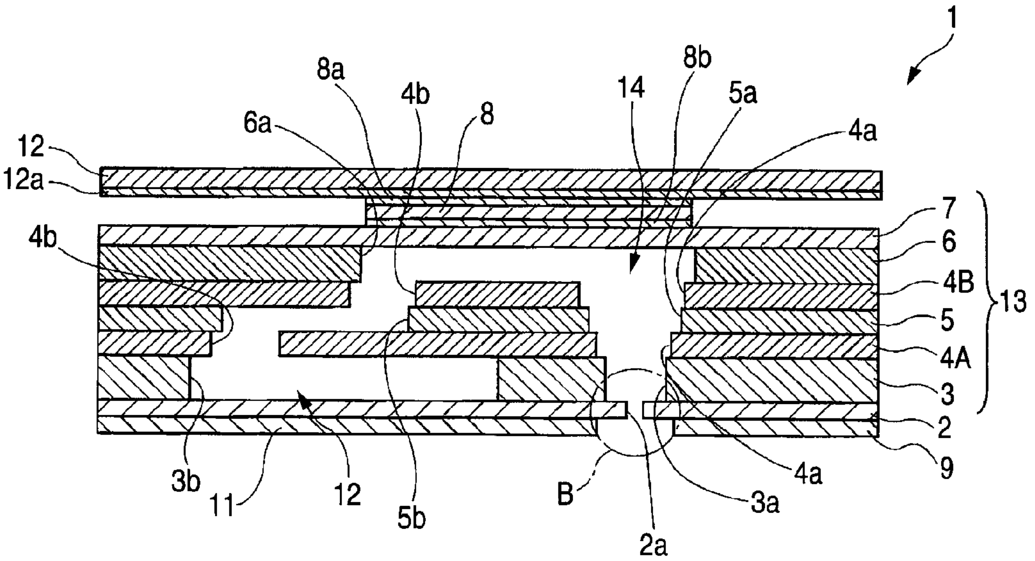
FIG. 2A is a section view taken along the line A-A in FIG. 1.
Figure 2B:
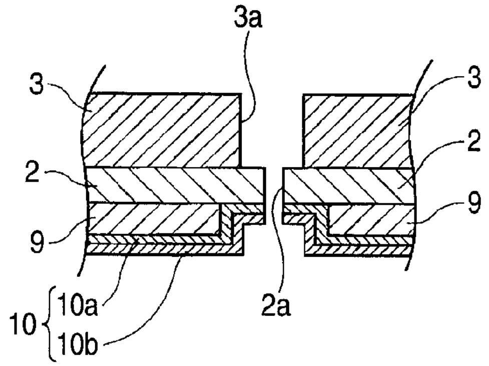
FIG. 2B is a detail view of a portion B of FIG. 2A.

FIGS. 1 and 2 show a liquid droplet ejection head of a first embodiment of the invention. FIG. 1 is a plan view, FIG. 2A is a section view taken along the line A-A in FIG. 1, and FIG. 2B is a detail view of a portion B of FIG. 2A.

As shown in FIG. 1, the liquid droplet ejection head 1 has: a vibration plate 7 which has an approximately parallelogram shape; plural piezoelectric elements 8 which are arranged on the vibration plate 7; and plural nozzles 2*a* which are formed at positions corresponding to the piezoelectric elements 8. When one of the piezoelectric elements 8 is driven, a liquid stored in the head is ejected as a liquid droplet from the corresponding one of the nozzles 2*a*. The reference numeral 7*a* denotes a supply hole which is disposed in the vibration plate 7, and through which the liquid is supplied from a liquid tank (not shown) to the interior of the head 1.

As shown in FIG. 2A, the liquid droplet ejection head 1 has a nozzle plate 2 in which the nozzles 2*a* are formed. On a face (rear face) of the nozzle plate 2 which is opposite to the ejection side, a pool plate 3 having a communication hole 3*a* and a liquid pool 3*b*, a supply hole plate 4A having a communication hole 4*a* and a supply hole 4*b*, a supply path plate 5 having a communication hole 5*a* and a supply path 5*b*, a supply hole plate 4B having the communication hole 4*a* and the supply hole 4*b*, a pressure generating chamber plate 6 having a pressure generating chamber 6*a*, and the vibration plate 7 are sequentially stacked as a flow path member 13. As described above, the plural piezoelectric elements 8 are arranged on the vibration plate 7. A flexible printed circuit board 12 (hereinafter, abbreviated as "FPC 12'") for applying a voltage to the piezoelectric elements 8 is disposed so as to cover the plural piezoelectric elements 8. When one of the piezoelectric elements 8 is driven through the FPC 12', a liquid stored in the head is ejected as a liquid droplet from the corresponding one of the nozzles 2*a*.

The liquid pool 3*b* constitutes a liquid supply path 12 which is continuous in a direction perpendicular to the plane of the paper. A nozzle supply path 14 which supplies the liquid to each of the nozzles 2*a*, and in which the liquid supply path 12 communicates with the pressure generating chamber 6*a* through the supply hole 4*b* and the supply path 5*b*, and the pressure generating chamber 6*a* communicates with the nozzle 2*a* through the communication holes 5*a*, 4*a*, 3 is configured.

A damper portion 11 which absorbs a change of the ejection amount of liquid droplets to enable stable ejection is formed in the region of the nozzle plate 2 corresponding to the liquid supply path 12. A protection member 9 is disposed on the surface of the nozzle plate 2 on the liquid droplet ejection side, and in the periphery of the nozzle 2*a* and in a corresponding region of the damper portion 11.

In the liquid droplet ejection head 1, as shown in FIG. 2B, the protection member 9 is joined to the periphery of the nozzle 2*a* and in a predetermined region of the damper portion 11 on the surface of the nozzle plate 2 on the liquid droplet ejection side. The configuration of the damper portion 11, and the disposition of the protection member 9 will be described later in detail. A water-repellent film 10 configured by a ground layer 10*a* and a water-repellent layer 10*b* is formed on the surface of the nozzle plate 2 in the periphery of the nozzle 2*a*, and the side face and surface of the protection member 9. Since the water-repellent film 10 is formed in the periphery of the nozzle 2*a*, the liquid droplet to be ejected from the nozzle 2*a* is stably ejected. Since the protection member 9 is disposed in the periphery of the nozzle 2*a*, the water-repellent film 10 in the periphery of the nozzle 2*a* can be protected from a mechanical damage due to paper jamming or the like.

Although FIGS. 1 and 2 show one liquid droplet ejection head 1, plural liquid droplet ejection heads 1 may be combined to constitute a liquid droplet ejection head unit, or plural liquid droplet ejection head units may be arranged to be used as a liquid droplet ejection head array.

Next, the components of the liquid droplet ejection head 1 will be described in detail.

(Nozzle Plate)

As the material of the nozzle plate 2, a synthetic resin is preferably used from the viewpoints that the plate is flexible in order to partly configure the damper portion 11 (see FIG. 4) in one part, and that the nozzle 2*a* is easily formed. Examples of the material are a polyimide resin, a polyethylene terephtalate resin, a liquid crystal polymer, an aromatic polyamide resin, a polyethylene naphtalate resin, and a polysulfone resin. Among the resins, a self-bonding polyimide resin is preferably used. The nozzle plate 2 preferably has a thickness of 10 to 100 μm. When the thickness is less than 10 μm, it is sometimes difficult to ensure a sufficient nozzle length and realize an excellent print quality (directionality). When the thickness exceeds 100 μm, it is sometimes difficult to ensure the flexibility and obtain a sufficient damper effect.

(Plates for Flow Path Member)

As the materials of the plates for the flow path member 13, such as the pool plate 3, a metal such as SUS is preferably used from the viewpoints that an etching process which will be described later can be smoothly performed, and that it has a high ink resistance.

(Protection Member)

As the material of the protection member 9, in same manner as the pool plate 3 and the like serving as the plates for the flow path member 13, a metal such as SUS is preferably used from the viewpoints that the etching process can be smoothly performed, and that it has a high ink resistance. When a plate of the same material as the pool plate 3 and the like is used, the etching process can be efficiently performed by a single operation. The protection member preferably has a thickness of 10 to 20 μm. When the thickness is less than 10 μm, the effect of protecting (reinforcing) the nozzle 2*a* and the damper portion 11 (see FIG. 4) is sometimes insufficient. When the thickness exceeds 20 μm, the performance of wiping an ink or foreign materials in the vicinity of the nozzle is sometimes insufficient.

(Piezoelectric Element)

As the material of the piezoelectric element 8, for example, lead zirconate titanate (PZT) and the like are used. The piezoelectric element has an individual electrode 8*a* on the upper face, and a common electrode 8*b* on the lower face. The individual electrode 8*a* and the common electrode 8*b* are formed by a sputtering process or the like. The common electrode 8*b* on the lower face is electrically connected to the vibration plate 7 by a conductive adhesive agent, and grounded through the vibration plate 7. In the piezoelectric element 8, an area required at least for ejecting a liquid droplet is individualized and joined to a position of the vibration plate 7 corresponding to the pressure generating chamber 6*a*.

(Water-Repellent Film)

As the ground layer 10*a* constituting the water-repellent film 10, for example, a silicon oxide film such as SiO, $SiO_2$, or $SiO_x$, or a silicon oxide film such as $Si_2N_3$ or $SiN_X$ having a thickness 10 to 100 nm is preferably used because such a film has a high ink resistance, and exhibits a high adhesiveness with a resin such as polyimide used as the nozzle plate 2, and a fluorine water-repellent material used in the water-repellent layer 10*b*. As the water-repellent layer 10*b*, for example, a fluorine water-repellent film made of a fluorine compound, a silicone water-repellent film, a plasma-polymerized protection film, polytetrafluoroethylene (PTFE) nickel eutectoid plating, and the like are useful. Among them, a fluorine water-repellent film made of a fluorine compound is preferable because it has excellent water repellency and adhesiveness. Preferably, the water-repellent layer 10*b* has a thickness of 10 to 50 nm.

(Liquid Flow)

Figure 3:
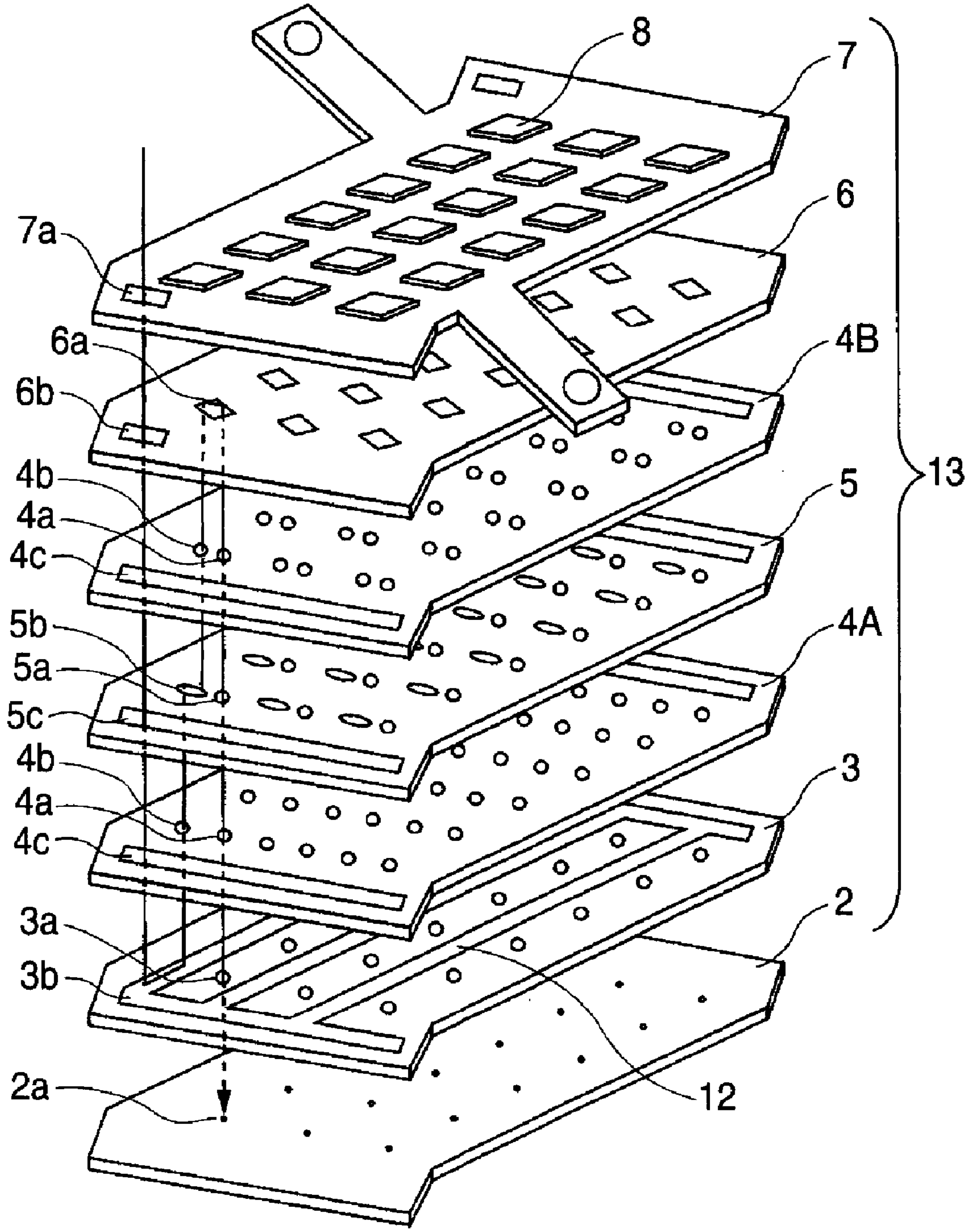
FIG. 3 is an exploded perspective view of the liquid droplet ejection head shown in FIG. 1.

The liquid flow will be described with reference to FIG. 3. The liquid supplied to the supply hole 7*a* of the vibration plate 7 is ejected as a liquid droplet from the nozzle 2*a* of the nozzle plate 2 through a supply hole 6*b* of the pressure generating chamber plate 6, a pool (¼) 4*c* of the second supply hole plate 4B, a pool (2/4) 5*c* of the supply path plate 5, a pool (¾) 4*c* of the first supply hole plate 4A, a liquid pool (4/4) 3*b* of the pool plate 3, the liquid supply path 12, the supply hole 4*b* of the first supply hole plate 4A, the supply path 5*b* of the supply path plate 5, the supply hole 4*b* of the second supply hole plate 4B, the pressure generating chamber 6*a* of the pressure generating chamber plate 6, the communication hole 4*a* of the second supply hole plate 4B, the communication hole 5*a* of the supply path plate 5, the communication hole 4*a* of the first supply hole plate 4A, and the communication hole 3*a* of the pool plate 3. In this way, the liquid pool 3*b* and the liquid supply path 12 are commonly used for supplying the liquid to the nozzles 2*a*.

Figure 4A:
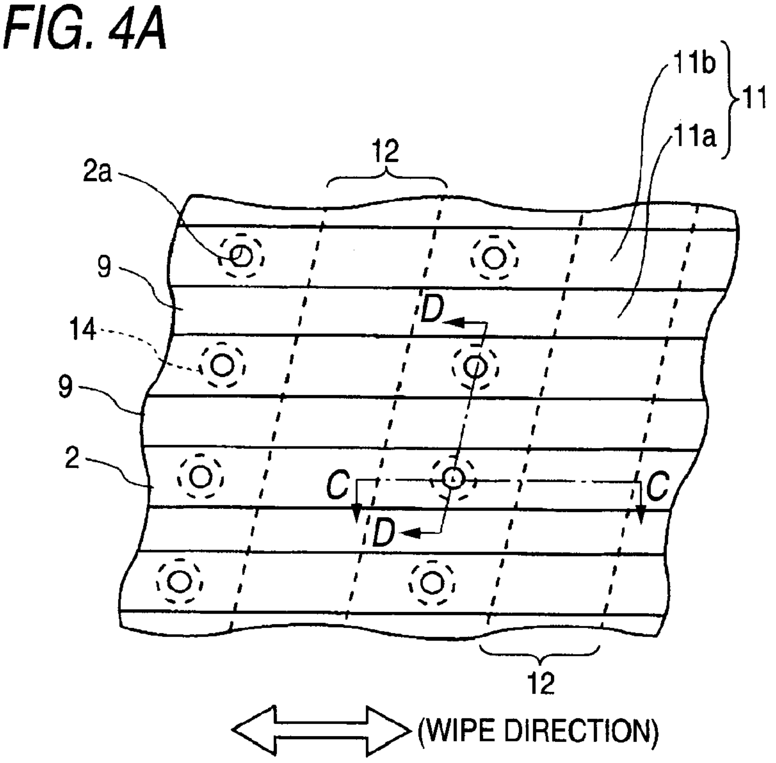
FIGS. 4A and 4B show a damper portion in a first embodiment.
Figure 4B:
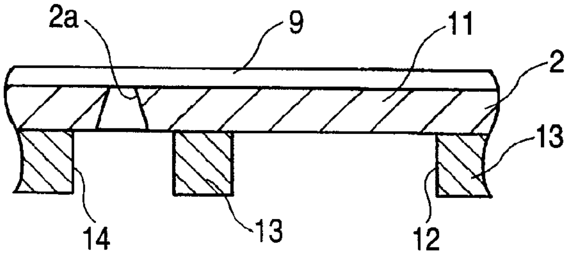
Figure 4C:
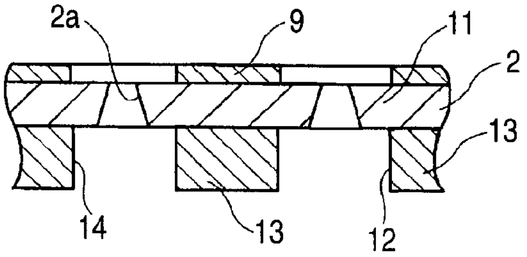
FIG. 4C is a section view taken along the line D-D in FIG. 4A.

FIG. 4 shows the damper portion in the first embodiment. FIG. 4A is a plan view, FIG. 4B is a section view taken along the line C-C in FIG. 4A, and FIG. 4C is a section view taken along the line D-D in FIG. 4A.

In the first embodiment, as shown in FIG. 4, the damper portion 11 which absorbs a change of the ejection amount of liquid droplets to enable stable ejection is formed in the region of the nozzle plate 2 corresponding to the liquid supply path 12 formed in the flow path member 13.

The embodiment further comprises the protection member 9 which is disposed on the surface of the nozzle plate 2 on the liquid droplet ejection side, and in the periphery of the nozzle 2*a* and at least one part of the damper portion 11. A damper reinforcement portion 11*a* is formed by the part of the damper portion 11 in which the protection member 9 is disposed, and a damper function portion 11*b* is formed by a part of the damper portion in which the protection member 9 is not disposed.

In the embodiment, the damper portion 11 is integrally formed by a polyimide resin which is a flexible material, so as to have the same thickness as the nozzle plate 2. The protection member 9 and the flow path member 13 are configured by an SUS plate.

In the embodiment, the nozzles 2*a* are arranged as plural nozzle rows in parallel to the disposition direction of the liquid supply path 12.

The protection member 9 extends so as to bridge over plural nozzle rows in a direction intersecting with the liquid supply path 12, and is disposed in the direction of wiping the surfaces of the nozzles 2*a*.

Meanwhile, the above-mentioned word "the direction of wiping" means a direction of a wiping unit's (for example, blade etc) transference relative to the surface of the nozzles 2*a* in sweeping the surface of the nozzles 2*a* by wiping.

(Method of Producing Liquid Droplet Ejection Head)

FIGS. 5A to 5D show steps of producing the liquid droplet ejection head 1.

(1) Joining of Plates (First Step)

Figure 5A:
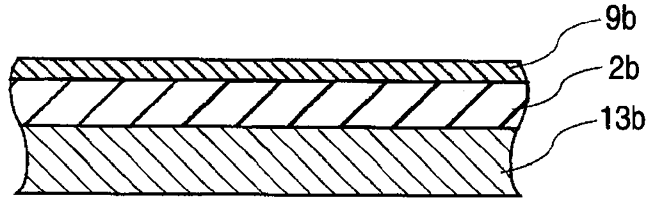
FIGS. 5A to 5G show steps of producing the liquid droplet ejection head.

First, as shown in FIG. 5A, a protection member plate 9*b* made of, for example, SUS and having a thickness of 10 μm, and a flow path member plate 13*b* are joined together by thermal compression (for example, 300° C. and 300 kgf) to both faces of a plate 2*b* for the nozzles made of, for example, a self-bonding polyimide film and having a thickness of 25 μm. In the case where a self-bonding polyimide film is not used as the plate 2*b* for the nozzles, the joining may be conducted by using an adhesive agent or the like.

(2) Etching of Flow Path Member Plate (Second Step)

Figure 5B:
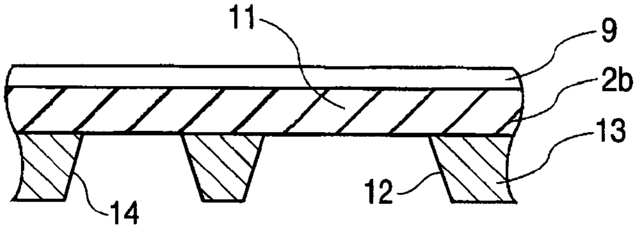

Next, as shown in FIG. 5B ((b1) is a section view taken along the line C-C, and (b2) is a section view taken along the line D-D, the same shall apply hereinafter), a part of the flow path member plate 13*b* is etched into a predetermined pattern, and the flow path member 13 having the liquid supply path 12 and the nozzle supply path 14 is formed so that, in a part of a region corresponding to the liquid supply path 12, the plate 2*b* for the nozzles has the damper portion 11 which absorbs a change of the ejection amount of liquid droplets to enable stable ejection (second step). As the etching method, for example, a usual method in which a resist that allows patterning so as to have a desired pattern by the photolithography method is used as a mask may be employed.

(3) Etching of Protection Member Plate (Third Step)

At the same time with the above-described second step, as shown in FIG. 5B, apart of the protection member plate 9*b* is etched into a pattern in which the opening width (the width of the damper function portion 11*b* which will be described later) is 250 μm, and the protection member 9 is formed in the periphery of a portion which is on the surface of the nozzle plate 2 on the liquid droplet ejection side, and in which the nozzle 2*a* is to be formed, and at least one part of the damper portion 11 so that the damper portion 11 is partitioned into the damper reinforcement portion 11*a* (for example, the width of 200 μm) and the damper function portion 11*b* (the width of 202 μm, as described above) (see FIG. 4). Also as the etching method in this case, for example, a usual method in which a resist that allows patterning so as to have a desired pattern by the photolithography method is used as a mask may be employed. Alternatively, the second and third steps may be separately performed. When the steps are performed simultaneously as in the embodiment, however, the steps can be performed more efficiently. The wiping direction is indicated by the arrows.

(4) Formation of Water-Repellent Film (Third Dash Step)

Figure 5C:
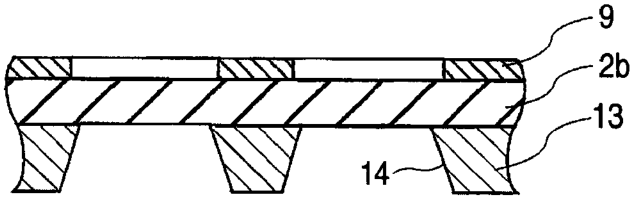

As required, as shown in FIG. 5C, preferably, a film of silicon dioxide ($SiO_2$) of 10 to 100 nm is formed by, for example, the sputtering method as the ground layer 10*a* on the surface of the plate 2*b* for the nozzles and the surface and side face of the protection member plate 9*b*, and thereafter a film of the water-repellent layer 10*b* made of a fluorine water-repellant agent is formed at 10 to 50 nm by the vapor deposition method to form the water-repellent film 10.

(5) Processing of Nozzles (Fourth Step)

Figure 5D:
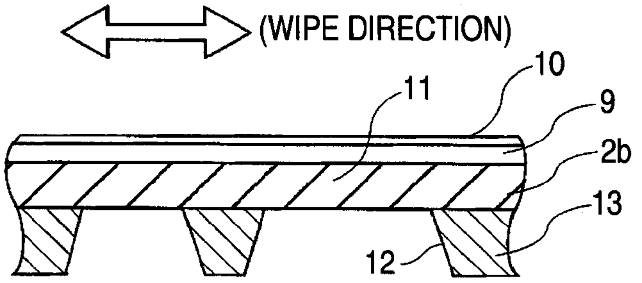
Figure 5E:
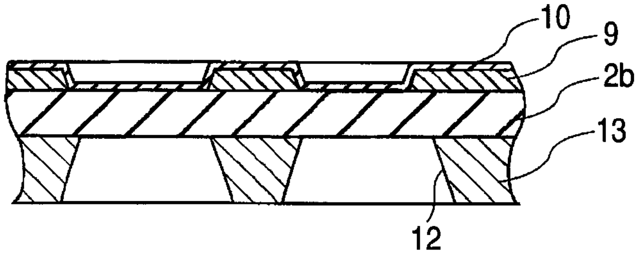
Figure 5F:
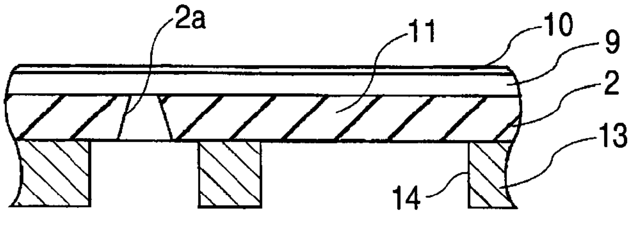
Figure 5G:
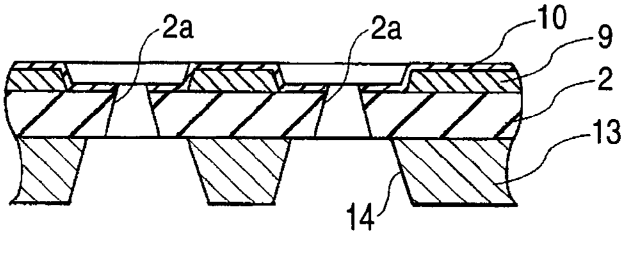

Next, as shown in FIG. 5D, laser processing is applied to the plate 2*b* for the nozzles from the side of the flow path member 13 to form the nozzle 2*a*, thereby forming the nozzle plate 2. As the laser used in this laser processing, a gas laser or a solid-state laser may be used. An example of a useful gas laser is an excimer laser, and an example of a useful solid-state laser is a YAG laser. In the lasers, an excimer laser is preferably used.

(6) Joining of Vibration Plate and Piezoelectric Elements (Fifth Step)

Next, as shown in FIG. 2, the vibration plate 7 and the plural piezoelectric elements 8 are joined onto the flow path member 13. As a joining method, an adhesive agent of, for example, a thermoplastic resin such as polyimide or polystyrene, or a thermosetting resin such as a phenol resin or an epoxy resin can be used.

(7) Disposition of Flexible Printed Circuit Board (Sixth Step)

Next, as shown in FIG. 2, the FPC 12' for applying a voltage to the piezoelectric elements 8 is disposed so as to cover the plural piezoelectric elements 8, so that, when one of the piezoelectric elements 8 is driven through the FPC 12', the liquid stored in the head is ejected as a liquid droplet from the corresponding one of the nozzles 2*a*.

(Effects of First Embodiment)

The above-described first embodiment can attain the following affects.

(a) Since the protection member 9 is disposed also on a part of the damper portion 11 in addition to the periphery of the nozzle 2*a*, the damper portion 11 can sufficiently exert the damper effect. Furthermore, the strength of the damper portion can be ensured, and the damper portion can be protected.

(b) Since the damper portion 11 is configured by the flexible material so as to have the same thickness as the nozzle plate 2, the number of components can be reduced, and an economical head can be supplied.

(C) The protection member 9 extends so as to bridge over plural nozzle rows in the direction intersecting with the liquid supply path 12, and is disposed in the direction of wiping the surfaces of the nozzles 2*a*. Therefore, the property of discharging liquids or foreign materials from the face of the nozzle 2*a* can be enhanced, and a sure wiping operation can be realized.

Second Embodiment

Figure 6A:
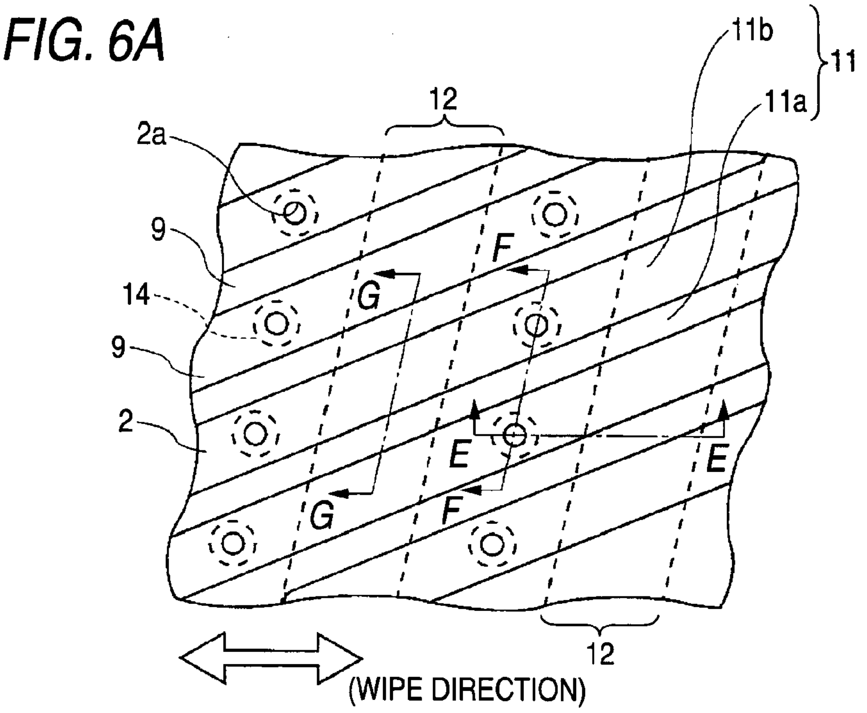
FIGS. 6A to 6D show a damper portion in a second embodiment.
Figure 6B:
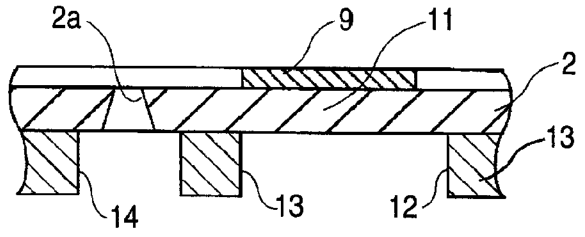
Figure 6C:
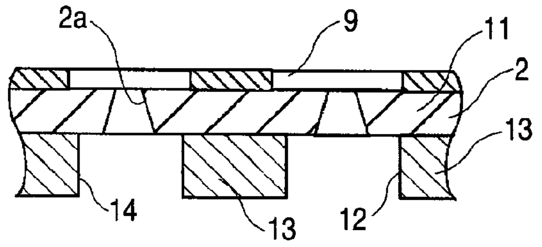
Figure 6D:
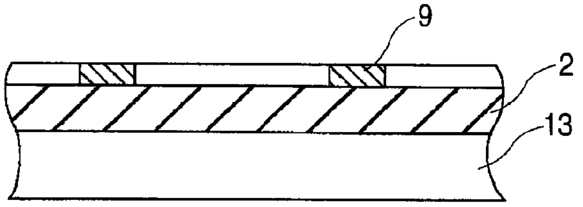

FIG. 6 shows a damper portion in a second embodiment, FIG. 6A is a plan view, FIG. 6B is a section view taken along the line E-E in FIG. 6A, FIG. 6C is a section view taken along the line F-F in FIG. 6A, and FIG. 6D is a section view taken along the line G-G in FIG. 6A.

As shown in FIG. 6, the second embodiment is identical with the first embodiment except that, in the first embodiment, the disposition (opening) shape of the protection member 9 is formed as a shape which obliquely extends, and exerts the same effects.

Third Embodiment

Figure 7A:
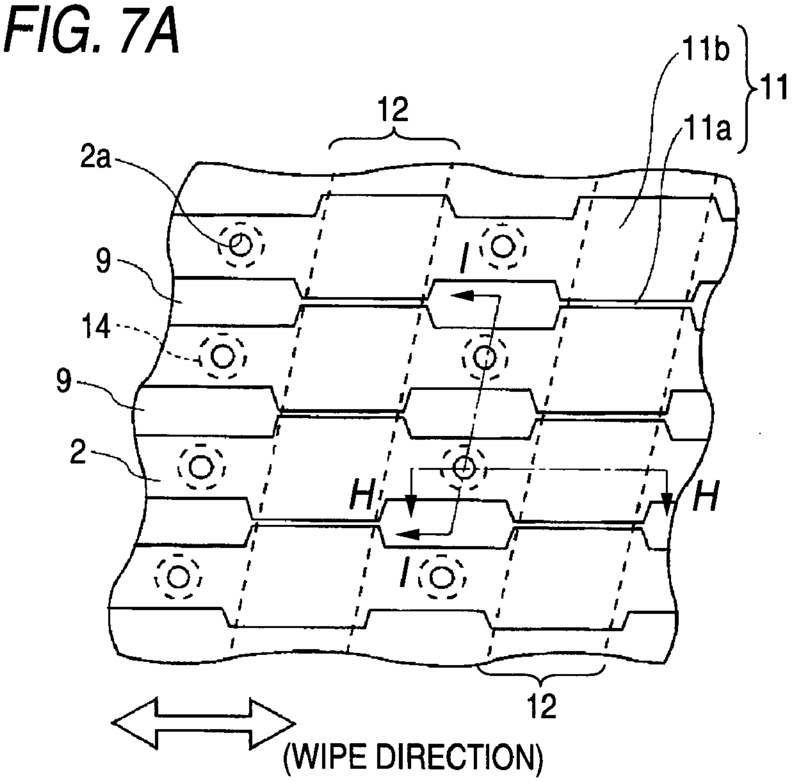
FIGS. 7A to 7C show a damper portion in a third embodiment.
Figure 7B:
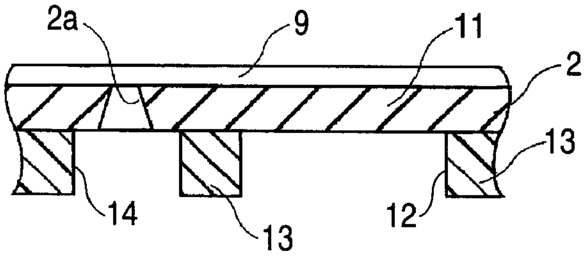
Figure 7C:
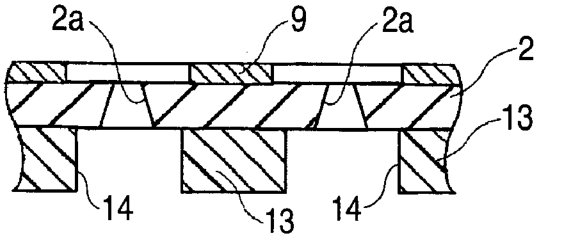

FIG. 7 shows a damper portion in a third embodiment, FIG. 7A is a plan view, FIG. 7B is a section view taken along the line H-H in FIG. 7A, and FIG. 7C is a section view taken along the line I-I in FIG. 7A.

As shown in FIG. 7, the third embodiment is identical with the first embodiment except that the disposition (opening) width of the protection member 9 in the first embodiment is configured so as to be changed, and exerts the same effects. Namely, the third embodiment is identical with the first embodiment except that the opening width of the protection member 9 in the damper function portion 11*b* is set to, for example, 350 μm, and that of the protection member 9 in the periphery of the nozzle 2*a* is set to, for example, 200 μm.

(Effects of Third Embodiment)

Since the opening width of the protection member 9 in the damper function portion 11*b* is increased (the disposition width of the protection member 9 is reduced), the reinforcement effect of the damper portion 11 can be limited to the minimum degree, and the damper effect can be enhanced to the maximum extent.

Fourth Embodiment

Figure 8A:
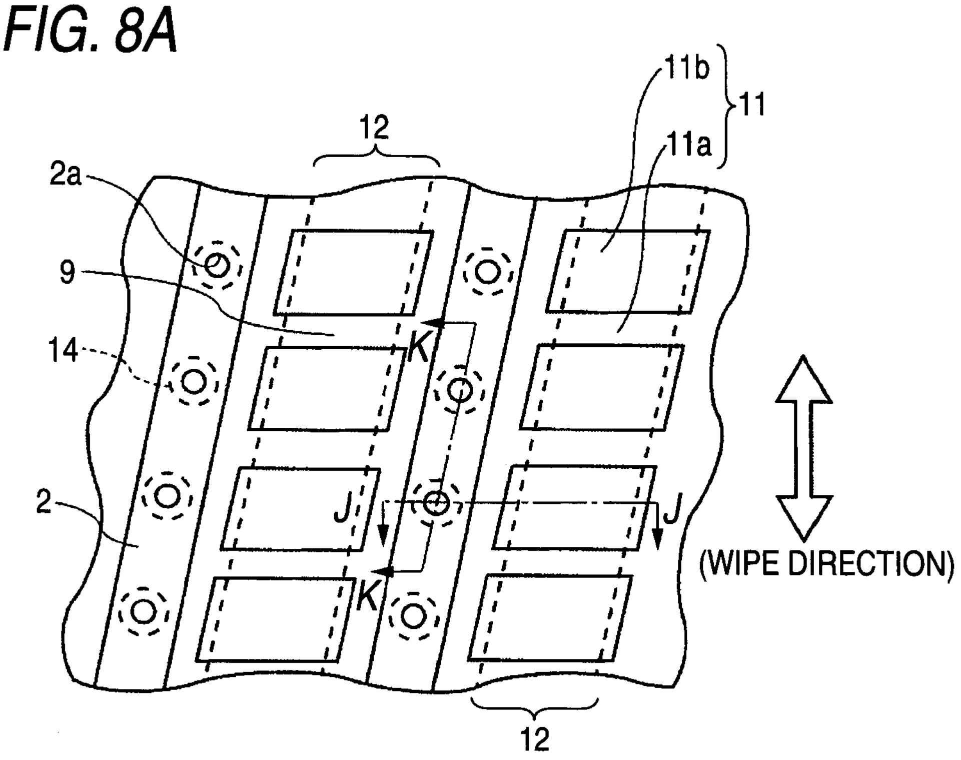
FIGS. 8A to 8C show a damper portion in a fourth embodiment.
Figure 8B:
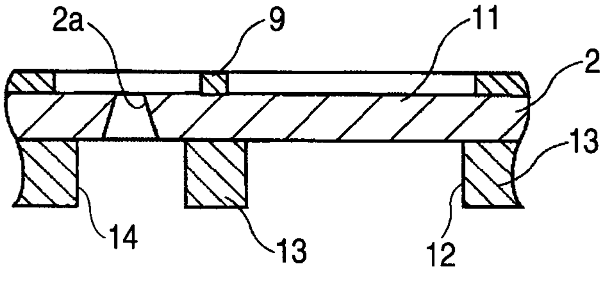
Figure 8C:
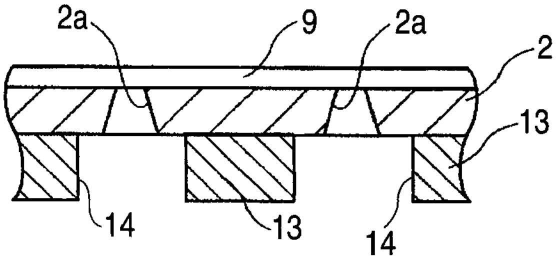

FIG. 8 shows a damper portion in a fourth embodiment, FIG. 8A is a plan view, FIG. 8B is a section view taken along the line J-J in FIG. 8A, and FIG. 8C is a section view taken along the line K-K in FIG. 8A.

As shown in FIG. 8, the fourth embodiment is identical with the first embodiment except that the disposition shape of the protection member 9 in the first embodiment is configured so that the shape of the damper function portion 11*b* has an independent island shape. Namely, the fourth embodiment is identical with the first embodiment except that the shape of the damper function portion 11*b* (the opening shape of the protection member 9) is formed so that the opening width of the protection member 9 has a rectangular island shape of, for example, 350 μm, and the opening shape of the protection member 9 in the periphery of the nozzle 2*a* is formed so that the opening width has a thin strip-like shape of 200 μm.

(Effects of Fourth Embodiment)

Since the disposition shape of the protection member 9 is configured so that the shape of the damper function portion 11*b* has an independent island shape, the degree of the damper effect can be adequately adjusted.

Fifth Embodiment

Figure 9A:
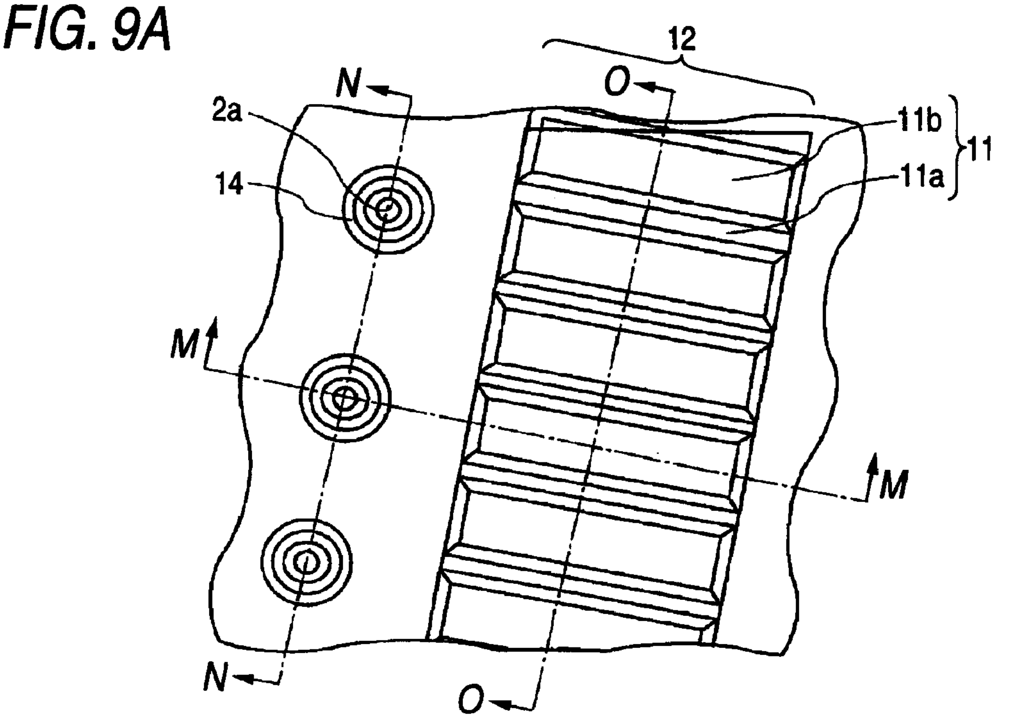
FIGS. 9A to 9D show a damper portion in a fifth embodiment.
Figure 9B:
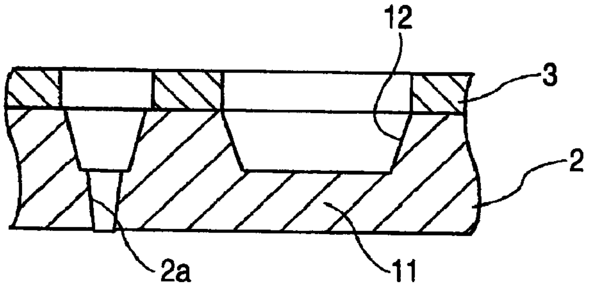
Figure 9C:
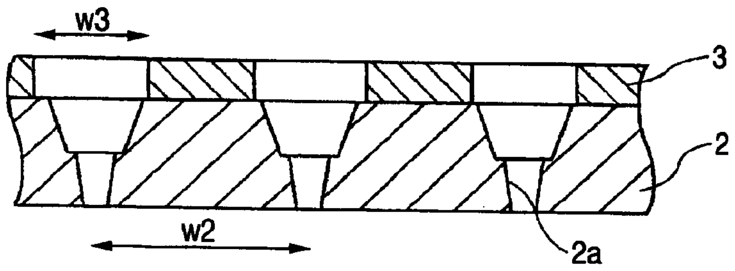
Figure 9D:
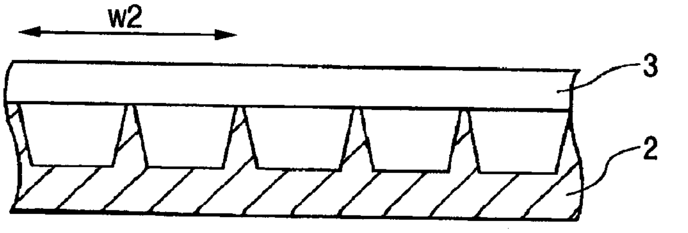

FIG. 9 shows a damper portion in a fifth embodiment, FIG. 9A is a plan view as seen from the rear face, FIG. 9B is a section view taken along the line M-M in FIG. 9A, FIG. 9C is a section view taken along the line N-N in FIG. 9A, and FIG. 9D is a section view taken along the line O-O in FIG. 9A.

As shown in FIG. 9, the damper portion 11 in the embodiment is configured by a thin portion which is obtained by reducing the thickness of the nozzle plate 2 by, for example, laser irradiation using a laser mask 15. Preferably, the thin portion is opened to an atmosphere, and at least one thin portion is independently disposed correspondingly to each of the nozzles 2*a*.

Figure 10A:
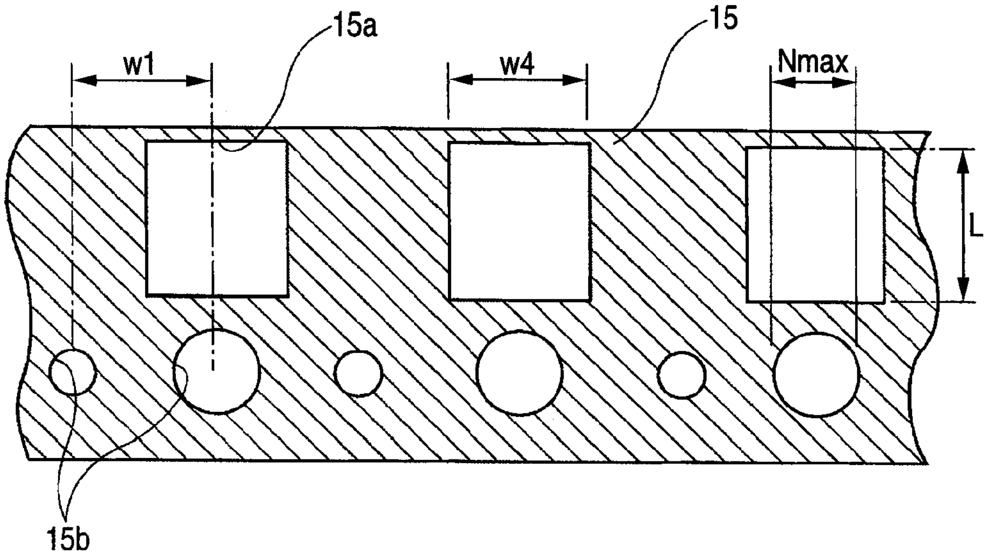
FIG. 10A is a plan view showing an example of a laser mask.
Figure 10B:
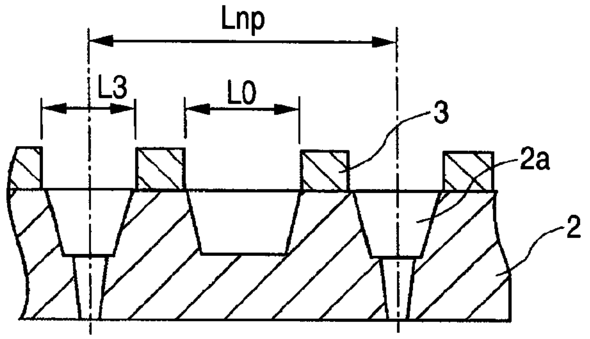
FIG. 10B is a section view taken along the line M-M in FIG. 9A showing a method of forming a damper portion 11 and a nozzle 2*a* by using the laser mask shown FIG. 10A.
Figure 10C:
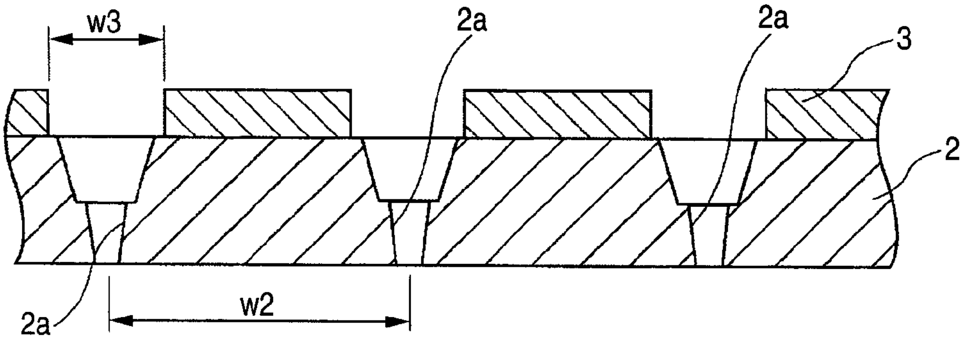
FIG. 10C is a section view taken along the line N-N in FIG. 9A showing a method of forming the damper portion 11 and the nozzle 2*a* by using the laser mask shown FIG. 10A.

FIG. 10A is a plan view showing an example of the laser mask, FIG. 10B is a section view taken along the line M-M in FIG. 9A showing a method of forming the damper portion 11 and the nozzle 2*a* by using the laser mask shown FIG. 10A, and FIG. 10C is a section view taken along the line N-N in FIG. 9A showing a method of forming the damper portion 11 and the nozzle 2*a* by using the laser mask shown FIG. 10A.

In the laser mask 15 in the embodiment, thin portion openings 15*a* and nozzle openings 15*b* are formed. In the embodiment, the laser mask 15 is placed on the incidence side, the nozzle arrangement pitch is w2, and a stage is moved by a width of w1. In the case where an m number of laser patterns are used for forming one nozzle 2*a*, when the opening diameter of the communication hole 4*a* of the pool plate 3 is w3, the maximum diameter of the pattern for the nozzle 2*a* is Nmax, and the dimension of a thinning region (the damper function portion 11*b*) in the direction of the nozzle row is w4, it is preferable to satisfy the following relationships. Namely, desired processing is efficiently carried out at a desired position by a combination of openings of the laser mask 15 and the pool plate 3.

$$w2-w3/2>(n-1)\cdot w1+N\max/2$$

$$w1-N\max/2>w3/2$$

$$w1>w4\cdot(n-1)$$

When the width of the common liquid supply path is L0, the pitch of nozzle rows is Lnp, the length of the opening of the laser mask 15 in a direction perpendicular to the nozzle rows is L3 (≈w3), and the dimension of the opening of the laser mask 15 in a direction perpendicular to the nozzle rows of the thinning region (the damper function portion 11*b*) is L, it is preferable to satisfy the following relationships.

$Lnp-L3>L$, preferably L<L0.

(Effects of Fifth Embodiment)

(A) Since the laser processing for the thin portion, and that for the nozzle 2*a* are simultaneously carried out, the damper portion 11 which surely exerts the damper effect can be produced further simply and efficiently.

(B) In the laser processing for the thin portion, and that for the nozzle, the laser mask 15 in which the thin portion openings 15*a* that are equal to or less than n (n is a natural number) are arranged, and the nozzle openings 15*b* that are two to n (n is a natural number) are arranged is used while the mask is shifted. Therefore, the laser processing for the thin portion, and that for the nozzle 2*a*, i.e., the processes of different processing depths can be carried out by using one mask. As a result, the damper portion which surely exerts the damper effect, and the nozzles having an excellent ejection performance can be produced further simply and efficiently.

Sixth Embodiment

Figure 11A:
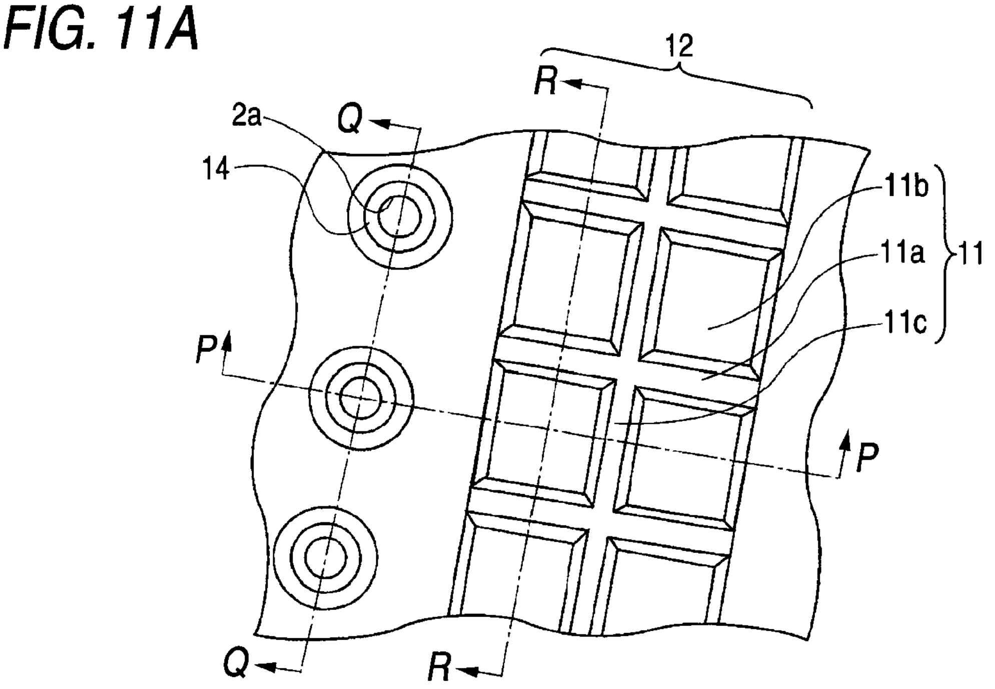
FIGS. 11A to 11D show a damper portion in a sixth embodiment.
Figure 11B:
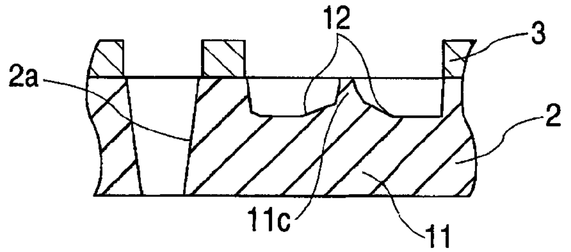
Figure 11C:
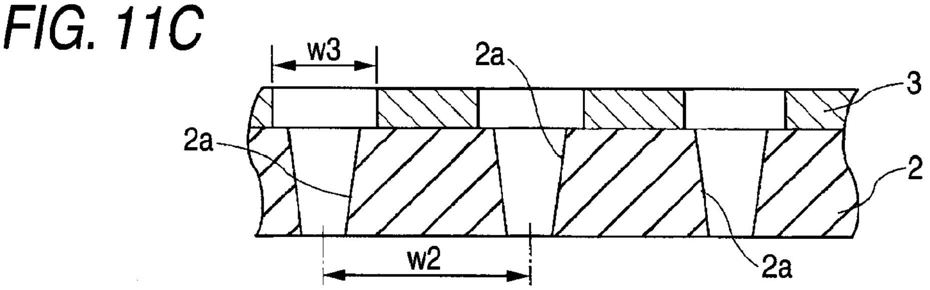
Figure 11D:
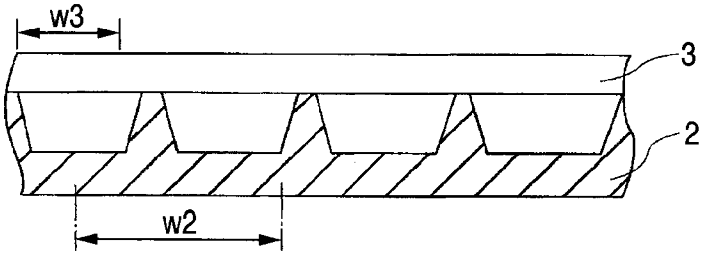
Figure 12A:
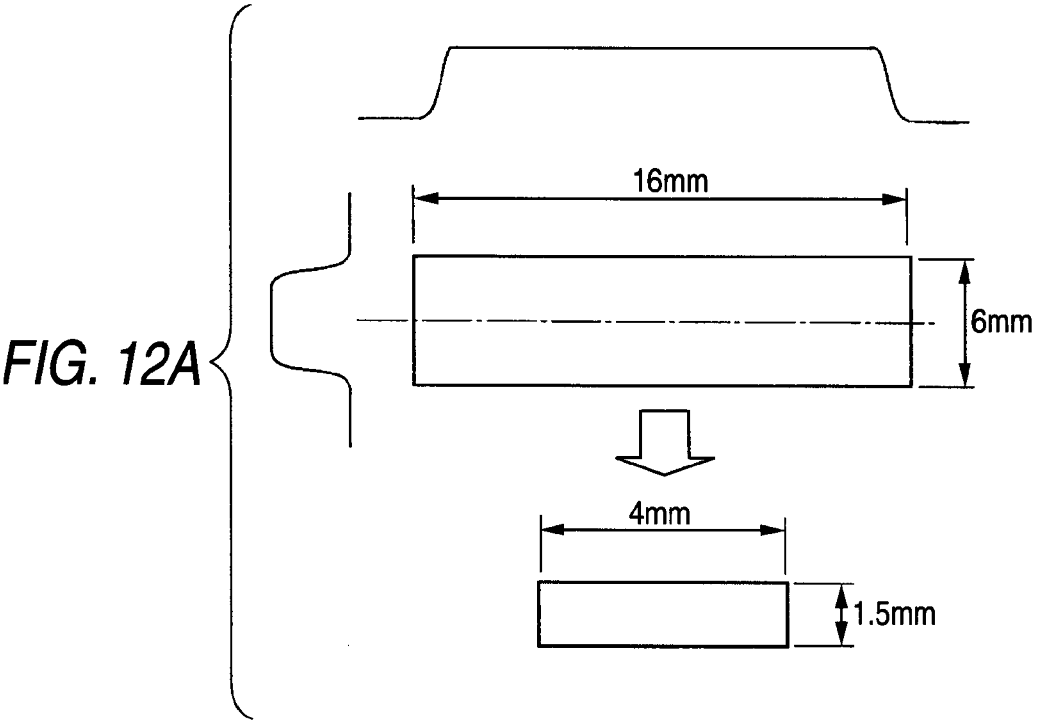
FIG. 12A is a plan view showing an irradiation area of laser in laser processing.
Figure 12B:
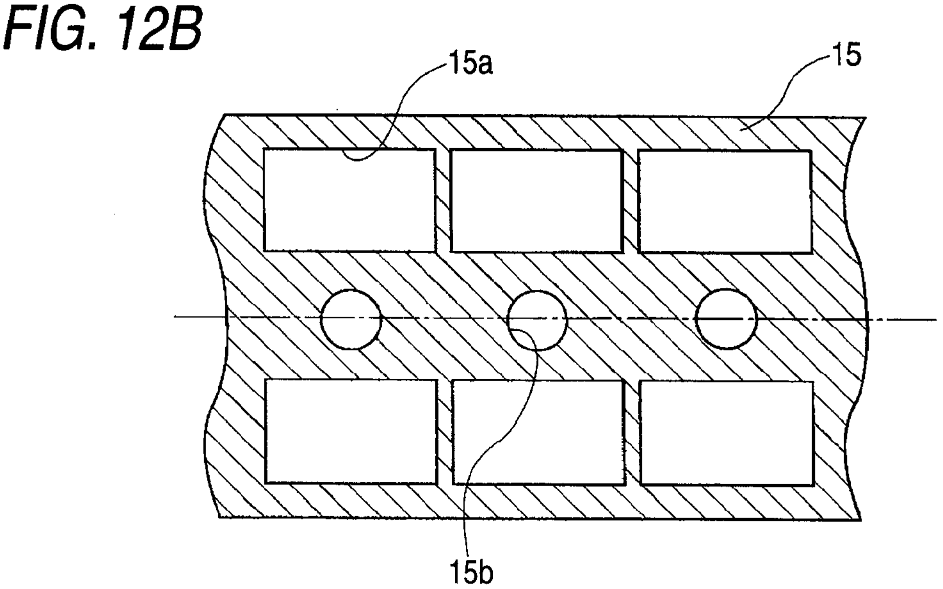
FIG. 12B is a plan view showing a laser mask used in the laser processing.

FIG. 11 shows a damper portion in a sixth embodiment, FIG. 11A is a plan view as seen from the rear face, FIG. 11B is a section view taken along the line P-P in FIG. 11A, FIG. 11C is a section view taken along the line Q-Q in FIG. 11A, and FIG. 11D is a section view taken along the line R-R in FIG. 11A. FIG. 12A is a plan view showing an irradiation area of laser in laser processing, and FIG. 12B is a plan view showing a laser mask used in the laser processing. FIG. 13 shows a damper portion in the sixth embodiment, FIG. 13A is a plan view, FIG. 13B is a section view taken along the line S-S in FIG. 13A, and FIG. 13C is a section view taken along the line T-T in FIG. 13A.

The sixth embodiment is identical with the fifth embodiment except that the characteristics that the intensity distribution of the laser (excimer laser) in the laser processing is rectangular in the longitudinal direction and gaussian in the short direction are used, the laser mask 15 shown in FIG. 12B is used, the irradiation area is set as a reference to the center in the short direction, the peak beam in the longitudinal direction (at the center in the short direction) is used in the laser processing of the nozzle 2*a*, and a weak beam in the short direction is used in the laser processing of the thin portion (the damper portion 11).

Figure 13A:
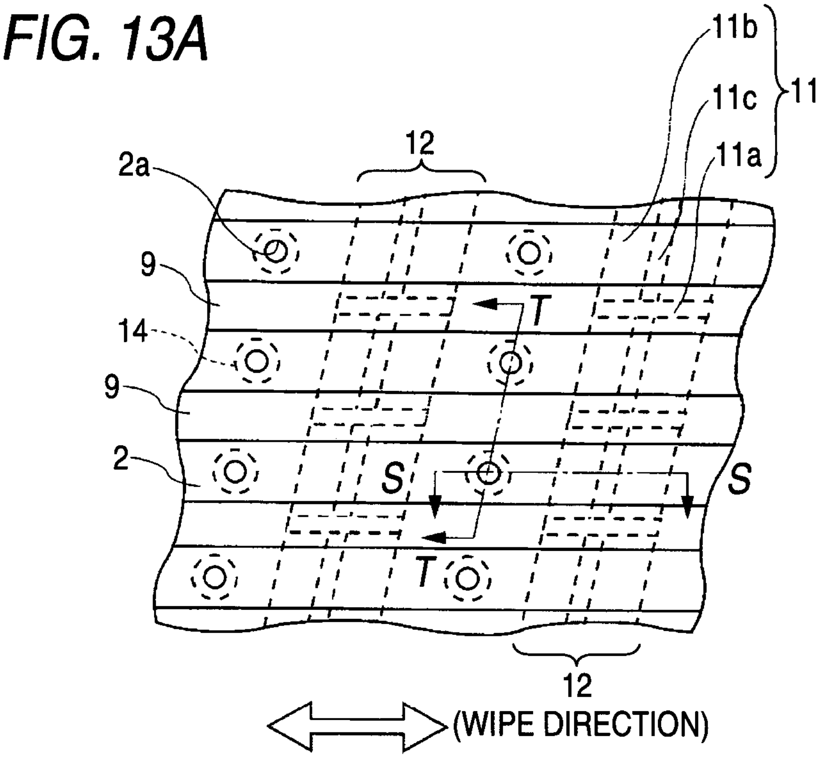
FIGS. 13A to 13C show a damper portion in the sixth embodiment.
Figure 13B:
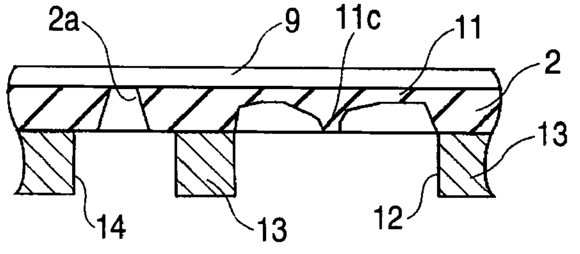
Figure 13C:
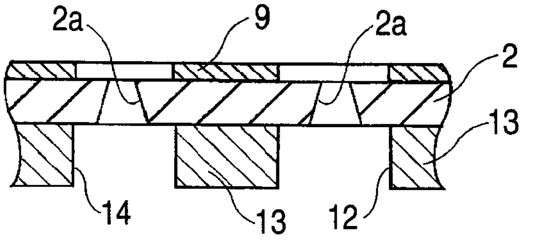

In FIG. 13A, the damper function portion 11*b* is indicated by broken lines, and a projection 11*c* which is not laser-processed and remains at the middle of the damper portion 11 is similarly indicated by broken lines.

(Effects of Sixth Embodiment)

(A) In the laser processing, the energy density distribution of the laser (excimer laser) which is rectangular in the longitudinal direction and gaussian in the short direction is used. Therefore, the laser processing for the thin portion, and that for the nozzle 2*a*, i.e., the processes of different processing depths can be simultaneously carried out by using one mask, and hence the energy utilization efficiency can be enhanced.

(B) Since the nozzle processing is carried out in the center region in the short direction, it is possible to realize a uniform ejection directionality.

(C) Since multiple nozzles are simultaneously processed, the process efficiency can be improved.

(D) The damper portion 11 is processed in a state where the energy density is small. Even when a special control is not conducted, therefore, the nozzle plate 2 is not penetrated.

Seventh Embodiment

Figure 14A:
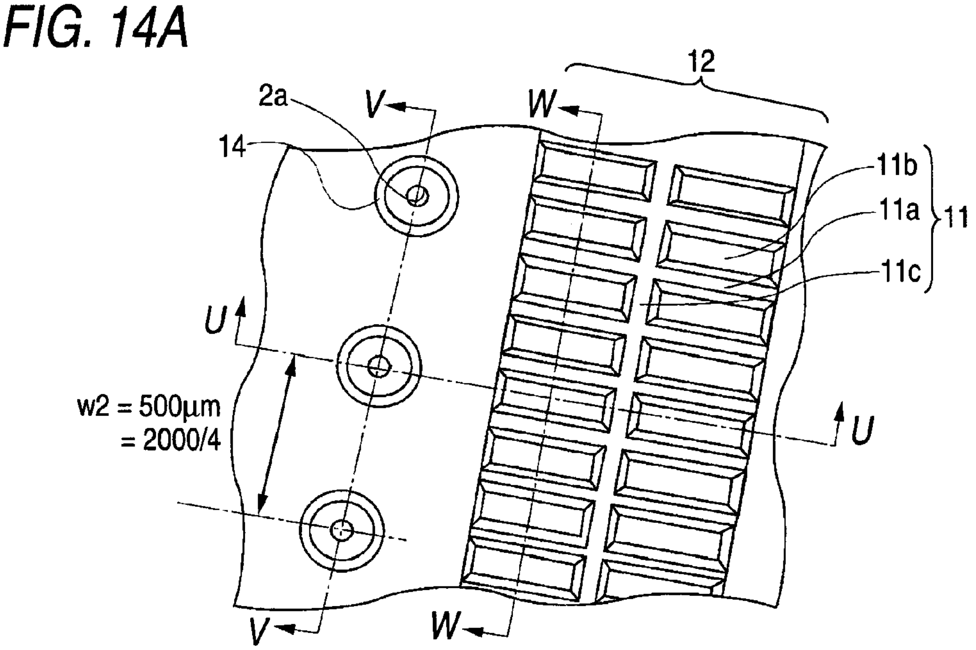
FIG. 14A is a plan view.
Figure 14B:
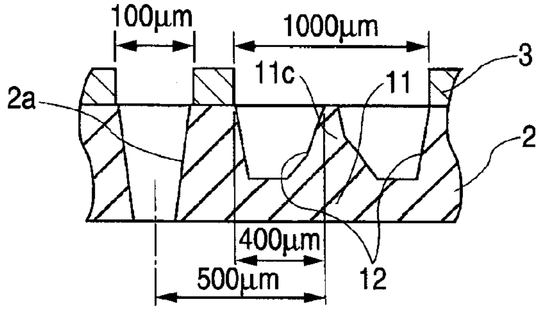
FIG. 14B is a section view taken along the line U-U in FIG. 14A.
Figure 14C:
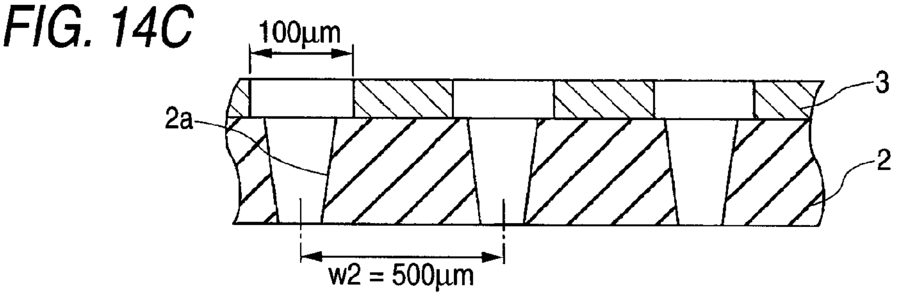
FIG. 14C is a section view taken along the line V-V in FIG. 14A.
Figure 14D:
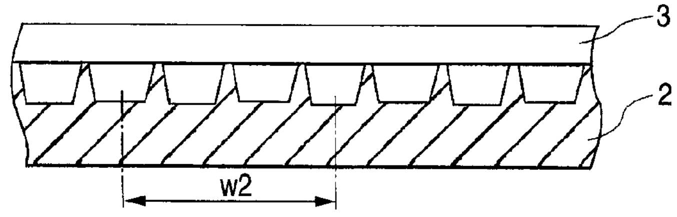
FIG. 14D is a section view taken along the line W-W in FIG. 14A.
Figure 15A:
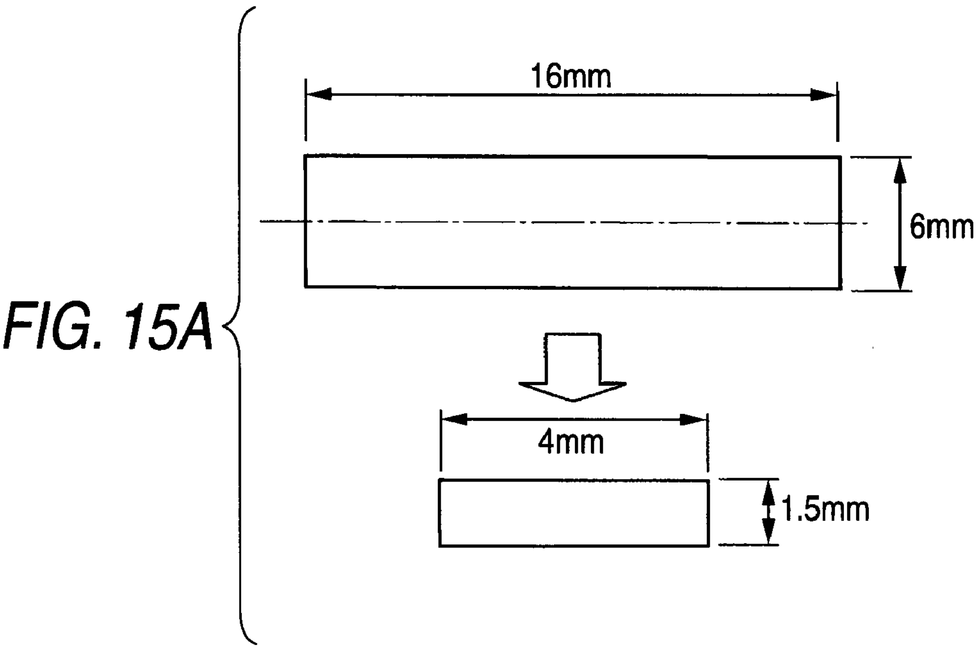
FIG. 15A is a plan view showing an irradiation area of laser in laser processing.
Figure 15B:
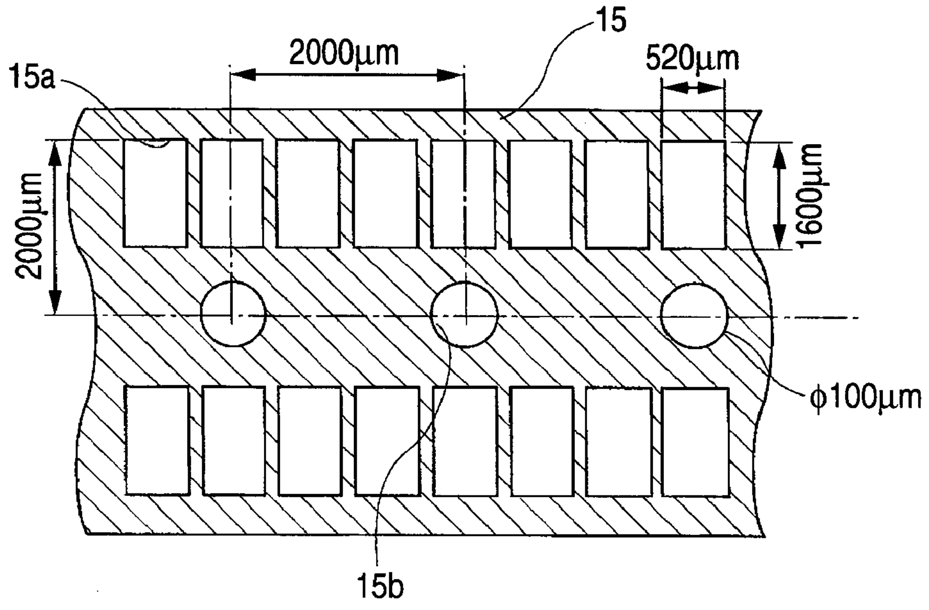
FIG. 15B is a plan view showing a laser mask used in the laser processing.

FIG. 14 shows a damper portion in a seventh embodiment, FIG. 14A is a plan view as seen from the rear face, FIG. 14B is a section view taken along the line U-U in FIG. 14A, FIG. 14C is a section view taken along the line V-V in FIG. 14A, and FIG. 14D is a section view taken along the line W-W in FIG. 14A. FIG. 15A is a plan view showing an irradiation area of laser in laser processing, and FIG. 15B is a plan view showing a laser mask used in the laser processing.

The seventh embodiment is identical with the sixth embodiment except that specific values are provided to the components, and a damper portion corresponding to a nozzle is partitioned into plural portions, and exerts the same effects.

Eighth Embodiment

Figure 16A:
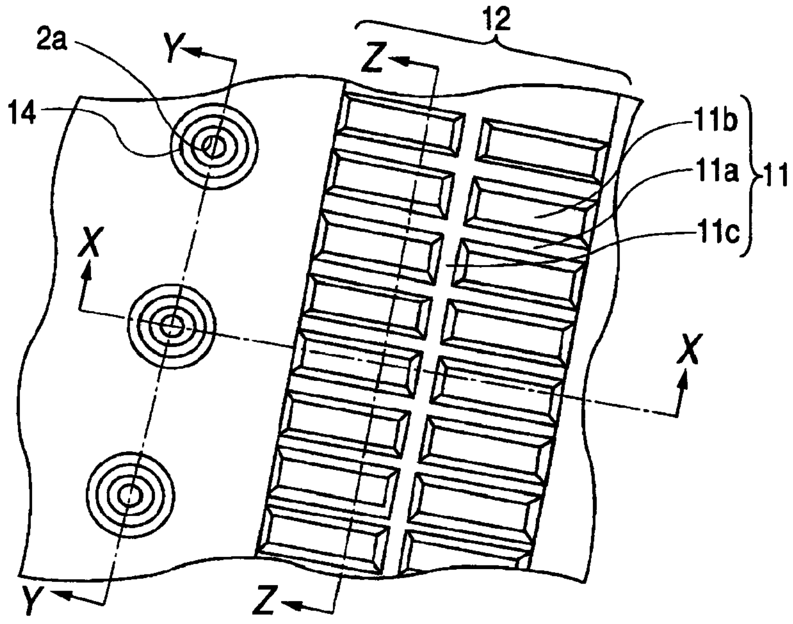
FIGS. 16A to 16D show a damper portion in an eighth embodiment.
Figure 16B:
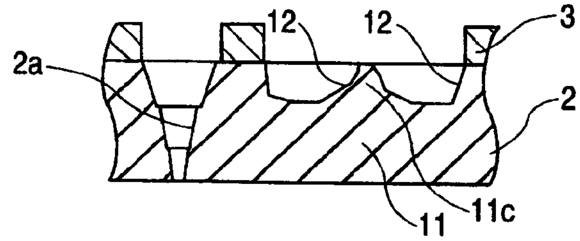
Figure 16C:
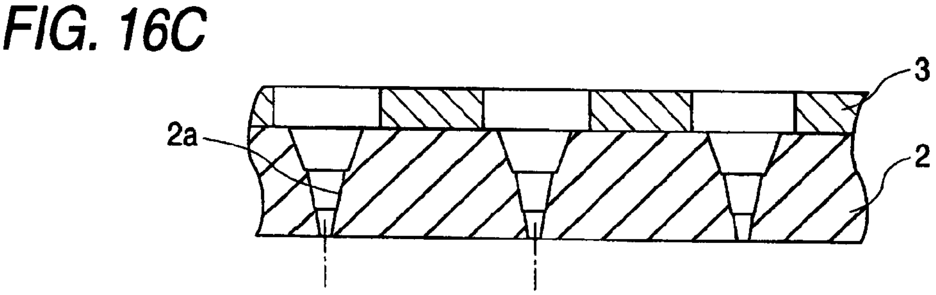
Figure 16D:
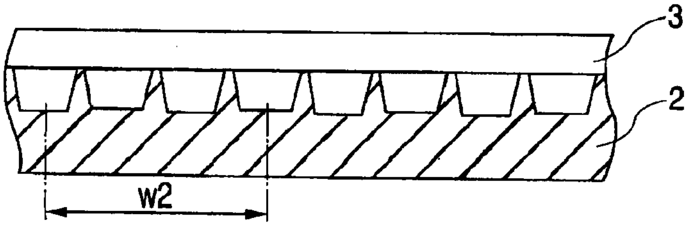
Figure 17A:
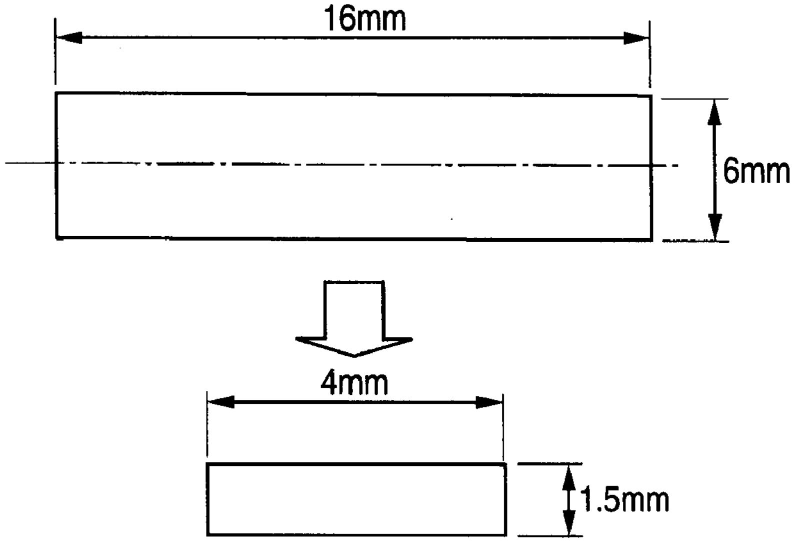
FIG. 17A is a plan view showing an irradiation area of laser in laser processing.

FIG. 16 shows a damper portion in an eighth embodiment, FIG. 16A is a plan view as seen from the rear face, FIG. 16B is a section view taken along the line X-X in FIG. 16A, FIG. 16C is a section view taken along the line Y-Y in FIG. 16A, and FIG. 16D is a section view taken along the line Z-Z in FIG. 16A. FIG. 17A is a plan view showing an irradiation area of laser in laser processing, and FIG. 17B is a plan view showing a laser mask used in the laser processing.

Figure 17B:
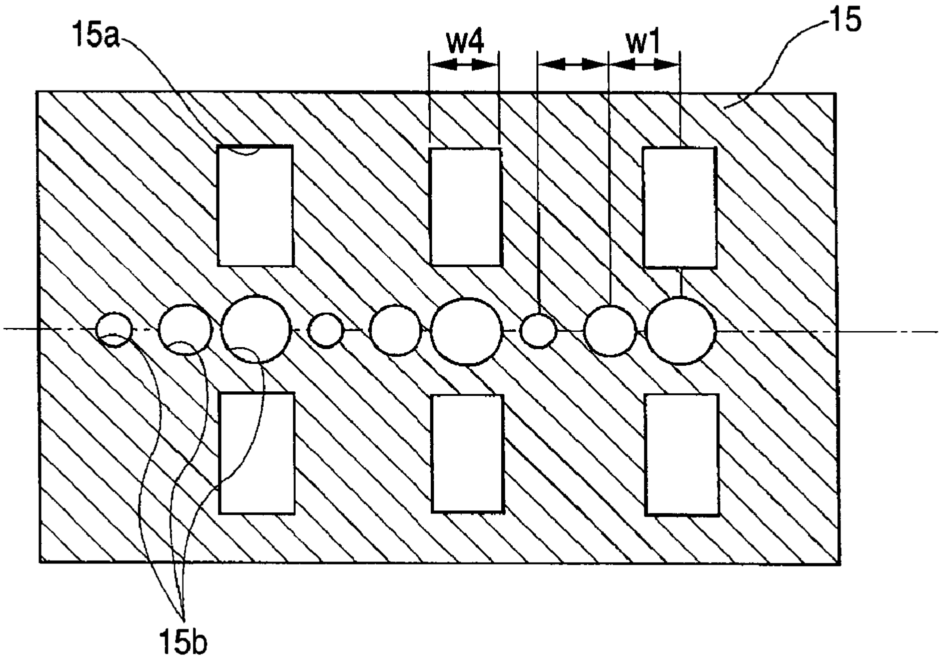
FIG. 17B is a plan view showing a laser mask used in the laser processing.

The eighth embodiment is identical with the sixth embodiment except that the laser mask shown in FIG. 17B is used while shifting two times, the nozzle 2*a* is formed by three irradations, the thin portion (the damper portion 11) is formed by one irradiation, and the thickness of the thin portion is equal to or less than ⅔ of that of the nozzle plate 2, and exerts the same effects.

In the embodiment, in the case where the width w4 of the damper portion 11 is set to be equal to or smaller than the pitch of the nozzle patterns (w1>w4), the thin portion has a shape such as shown in FIG. 16B, and, in the case of w1<w4, the laser processing is applied plural times on the damper portion 11 (this not shown), and hence a step is formed in the thin portion.

Ninth Embodiment

Figure 18A:
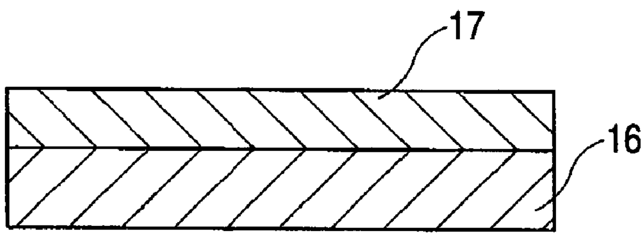
FIGS. 18A to 18D show a production method of another embodiment.
Figure 18B:
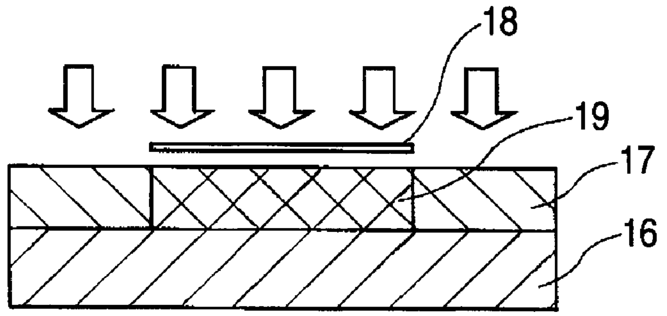
Figure 18C:
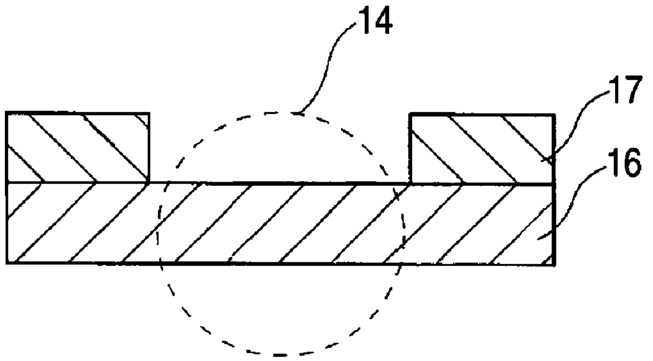
Figure 18D:
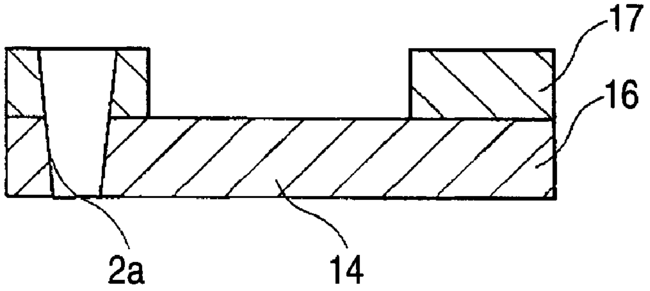

FIG. 18 shows a production method of another embodiment, FIG. 18A is a section view showing application of a photosensitive resin, FIG. 18B is a section view showing exposure in which a mask of the photosensitive resin is used, FIG. 18C is a section view showing formation of a step by development, and FIG. 18D is a section view showing formation of a nozzle.

In the ninth embodiment, as shown in FIG. 18A, a photosensitive resin 17 is first applied by the spin coat method onto a base film 16 made of a polyimide film. Next, as shown in FIG. 18B, the photosensitive resin 17 is exposed by using a mask 18, thereby curing an exposed portion of the photosensitive curable resin 17. Next, as shown in FIG. 18C, a development process is performed by a developer to remove away an uncured portion 19, thereby forming a step. Next, as shown in FIG. 18D, the nozzle 2*a* is processed by laser, and then joined to the other flow path member 13, thereby completing a liquid droplet ejection head.

(Effect of Ninth Embodiment)

A liquid droplet ejection head comprising a damper portion can be produced simply and economically.

Tenth Embodiment

Configuration of Color Printer

Figure 19:
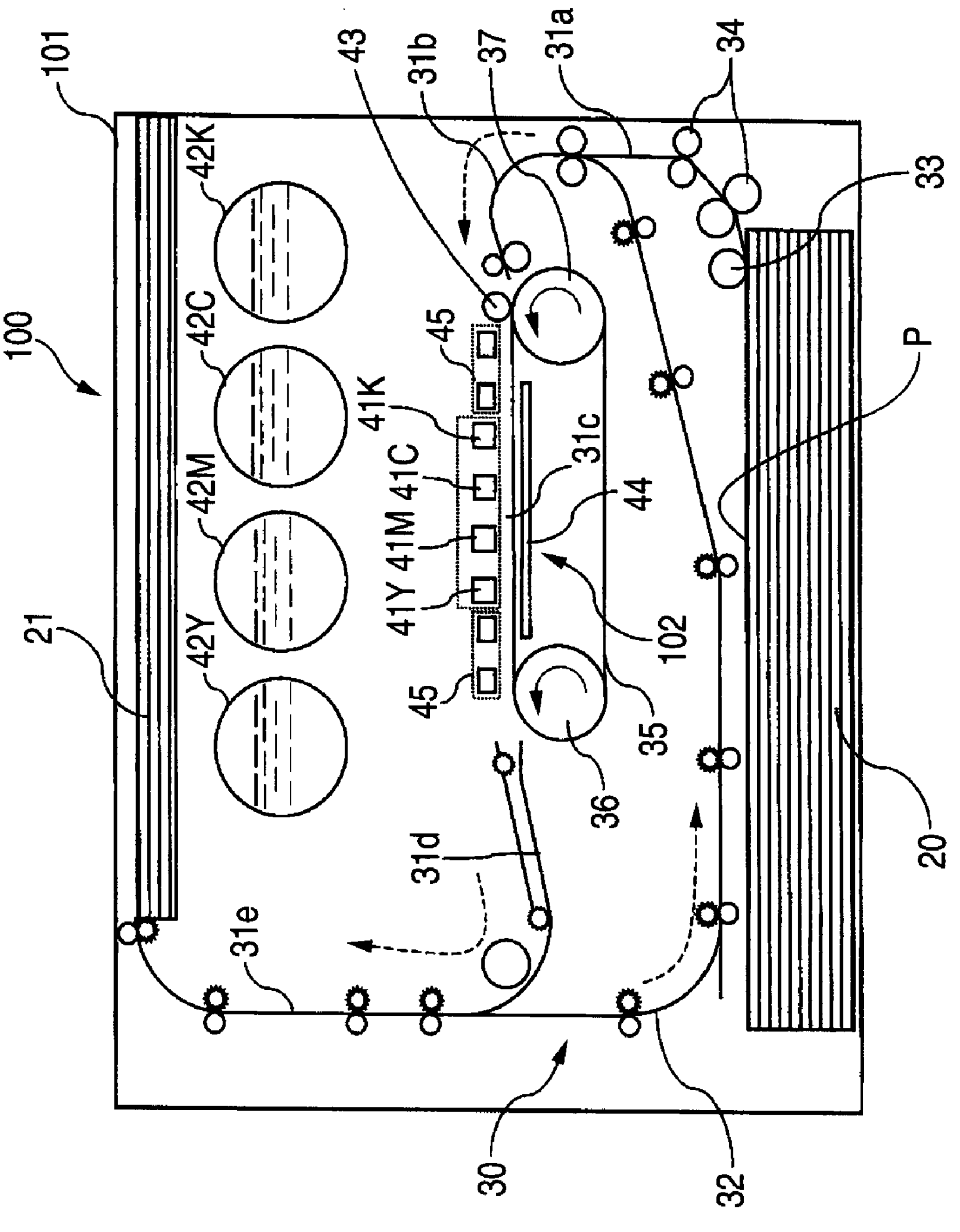
FIG. 19 is a diagram schematically showing a color printer to which a liquid droplet ejection apparatus of a tenth embodiment of the invention is applied.

FIG. 19 is a diagram schematically showing a color printer to which a liquid droplet ejection apparatus of a tenth embodiment of the invention is applied. The color printer 100 has an approximately box-like case 101. A sheet-supply tray 20 which houses sheets P is disposed in a lower portion of the interior of the case 101, and a discharge tray 21 on which a recorded sheet P is to be discharged is disposed in an upper portion of the case 101. The printer has main transportation paths 31*a* to 31*e* which extend from the sheet-supply tray 20 to the discharge tray 21 via a recording position 102, and a transportation mechanism 30 which transports the sheet P along an inversion transport path 32 extending from the side of the discharge tray 21 to that of the recording position 102.

At the recording position 102, plural liquid droplet ejection heads 1 shown in FIG. 1 are juxtaposed to constitute a record head unit, and four record head units are arranged in the transportation direction of the sheet P as record head units 41Y, 41M, 41C, 41K respectively ejecting ink droplets of yellow (Y), magenta (M), cyan (C), and black (K), thereby constituting a record head array.

The color printer 100 comprises: a charging roll 43 which serves as attracting means for attracting the sheet P; a platen 44 which is opposed to the record head units via an endless belt 35; a maintenance unit 45 which is placed in the vicinity of the record head units 41Y, 41M, 41C, 41K; and a control unit which is not shown, which controls various portions of the color printer 100, and which applies a driving voltage on the basis of an image signal to the piezoelectric elements 8 of the liquid droplet ejection heads 1 constituting the record head units 41Y, 41M, 41C, 41K to eject ink droplets from the nozzles 2*a*, thereby recording a color image onto the sheet P.

The record head units 41Y, 41M, 41C, 41K have an effective printing region which is equal to or larger than the width of the sheet P. As the method of ejecting liquid droplets, the piezoelectric method is used. However, the method is not particularly restricted. For example, another usual method such as the thermal method may be adequately used.

Ink tanks 42Y, 42M, 42C, 42K which respectively store inks of colors corresponding to the record head units 41Y, 41M, 41C, 41K are placed above the record head units 41Y, 41M, 41C, 41K. The inks are supplied from the ink tanks 42Y, 42M, 42C, 42K to the liquid droplet ejection heads 1 through pipes which are not shown.

The inks stored in the ink tanks 42Y, 42M, 42C, 42K are not particularly restricted. For example, usual inks such as water-, oil-, and solvent-based inks may be adequately used.

The transportation mechanism 30 comprises: a pickup roll 33 which takes out one by one the sheet P from the sheet-supply tray 20 to supply the sheet to the main transportation path 31*a*; plural transportation rolls 34 which are placed in various portion of the main transportation paths 31*a*, 31*b*, 31*d*, 31*e* and inversion transport path 32, and which transport the sheet P; the endless belt 35 which is disposed at the recording position 102, and which transports the sheet P toward the discharge tray 21; driving and driven rolls 36, 37 around which the endless belt 35 is looped; and a driving motor which is not shown, and which drives the transportation rolls 34 and the driving roll 36.

(Operation of Color Printer)

Next, the operation of the color printer 100 will be described. Under the control of the control unit, the transportation mechanism 30 drives the pickup roll 33 and the transportation rolls 34, takes out the sheet P from the sheet-supply tray 20, and transports the sheet P along the main transportation paths 31*a*, 31*b*. When the sheet P reaches the vicinity of the endless belt 35, charges are applied to the sheet P by the charging roll 43, and the sheet P is attracted by an electrostatic force to the endless belt 35.

The endless belt 35 is rotated by the driving of the driving roll 36. When the sheet P is transported to the recording position 102, a color image is recorded by the record head units 41Y, 41M, 41C, 41K.

The liquid pools 3*b* of the liquid droplet ejection head 1 shown in FIG. 19 are filled with the inks supplied from the ink tanks 42Y, 42M, 42C, 42K, the inks are supplied from the liquid pools 3*b* to the pressure generating chambers 6*a* through the supply holes 4*b* and the supply paths 5*b*, and the inks are stored in the pressure generating chambers 6*a*. When the control unit selectively applies the driving voltage to the plural piezoelectric elements 8 on the basis of the image signal, the vibration plate 7 flexes in accordance with the deformation of the piezoelectric element 8. This causes the capacity of the pressure generating chamber 6*a* to be changed, and the ink stored in the pressure generating chamber 6*a* is ejected as an ink droplet from the nozzle 2*a* onto the sheet P through the communication holes 5*a*, 4*a*, 3, thereby recording an image onto the sheet P. Images of Y, M, C, and K are sequentially superimposed on the sheet P, and a color image is recorded. In this case, the damper portion 11 is formed in the nozzle plate 2, and hence variation of the ejection amount of liquid droplets is absorbed, so that stable ejection and printing of high quality can be realized simply and economically.

The sheet P on which the color image has been recorded is discharged by the transportation mechanism 30 to the discharge tray 21 via the main transportation path 31*d*.

In the case where the double-sided recording mode is set, the sheet P which has been once discharged to the discharge tray 21 is returned to the main transportation path 31*e*, and transported through the inversion transport path 32 and again through the main transportation path 31*b* to the recording position 102. A color image is recorded on the face of the sheet P that is opposite to the face on which recording has been previously performed, by the record head units 41Y, 41M, 41C, 41K.

The invention is not restricted to the above-described embodiments and examples, and may be variously modified without departing from the spirit of the invention.

In the embodiment, for example, the protection member 9 is used. Alternatively, the protection member 9 may not be used. As the protection member 9, SUS is used. Alternatively, a resin may be used. The laser processing for the thin portion, and that for the nozzle are simultaneously carried out. Alternatively, the processings may be separately carried out.

The liquid droplet ejection head, apparatus for ejecting liquid droplets, and method of producing a liquid droplet ejection head of the invention are effectively used in various industrial fields in which high-resolution patterns of image information are requested to be formed by ejecting liquid droplets, such as the electric and electronic industry field in which, for example, a color filter for a display device is formed by ejecting inks onto the surface of a polymer film or glass by using the inkjet method, bumps for mounting components are formed by ejecting solder paste onto a circuit board, and wirings are formed on a circuit board, and the medical field in which bio chips for checking reaction with a sample are produced by ejecting a reaction reagent to a glass substrate or the like.

What is claimed is:

1. A method of producing liquid droplet ejection head comprising:

joining a flow path member plate and a protection member plate to opposite faces of a plate for nozzles, the protection member plate being disposed on a surface of the plate for nozzles that is on a liquid droplet ejection side of the plate for nozzles;

a first forming step including forming a flow path member including at least the flow path member plate, the flow path member having liquid supply paths and a damper portion in at least one part of a region, the region being on the plate for nozzles, corresponding to the liquid supply paths by etching a predetermined pattern into at least the flow path member plate, the damper portion reducing a fluctuation of an ejection amount of the liquid droplets to enable stable ejection;

after the first forming step, a second forming step including forming a nozzle plate by performing laser processing on the plate for nozzles from a side of the flow path member to form the nozzles;

wherein the protection member plate is separate from the damper portion and is in a periphery of the nozzles and at least one part of the damper portion, and the damper portion is formed to include a damper reinforcement portion comprising a first part of the damper portion in which the protection member is disposed, and a damper function portion comprising a second part of the damper portion in which the protection member is not disposed, the second part of the damper portion being distinct from the first part of the damper portion.

2. The method for producing liquid droplet ejection head as claimed in claim 1, wherein the plate for nozzles in joining comprises a flexible plate, and the damper portion in the first joining has a same thickness as the nozzle plate in a stacking direction of the plates.

3. The method for producing liquid droplet ejection head as claimed in claim 1, wherein the damper portion in the first forming step comprises a thin portion formed by reducing a thickness of the nozzle plate.

4. The method for producing liquid droplet ejection head as claimed in claim 3, wherein the thin portion in the first forming step is independently disposed so as to correspond to at least one of the nozzles.

5. The method for producing liquid droplet ejection head as claimed in claim 3, wherein the thin portion in the first forming step is formed by performing laser processing, and the laser processing on the thin portion in the first forming step is simultaneously performed with the laser processing on the nozzles in the second forming step.

6. The method for producing liquid droplet ejection head as claimed in claim 5, wherein the laser processing on the thin portion in the first forming step, and the laser processing on the nozzles in the second forming step are performed by using a mask, wherein the mask comprises:

thin portion openings of n or less; and nozzle openings of from 2 to n, provided that n is a natural number.

7. A method for producing liquid droplet ejection head comprising:

joining a flow path member plate and a protection member plate to opposite faces of a plate for nozzles, the protection member plate being disposed on a surface of the plate for nozzles that is on a liquid droplet ejection side of the plate for nozzles;

a first forming step including forming a flow path member including at least the flow path member plate, the flow path member having liquid supply paths and a damper portion in at least one part of a region corresponding to the liquid supply paths by etching a predetermined pattern into at least the flow path member plate, the damper portion reducing a fluctuation of an ejection amount of the liquid droplets to enable stable ejection;

after the first forming step, a second forming step including forming a protection member in at least one part of a periphery of a portion, where nozzles are to be formed, of a surface of the plate for nozzles on a liquid droplet ejection side, and partitioning the damper portion into a damper reinforcement portion and a damper function portion by etching a predetermined pattern into at least one part of the protection member plate; and after the second forming step, a third forming step including forming a nozzle plate by performing laser processing on the plate for nozzles from a side of the flow path member to form the nozzles;

wherein the protection member plate is separate from the damper portion and is in a periphery of the nozzles and at least one part of the damper portion, and the damper reinforcement portion comprises a first part of the damper portion in which the protection member is disposed, and the damper function portion comprises a second part of the damper portion in which the protection member is not disposed, the second part of the damper portion being distinct from the first part of the damper portion.

8. The method for producing liquid droplet ejection head as claimed in claim 7, wherein the plate for nozzles in the joining comprises a flexible plate, and the damper portion has a same thickness as the nozzle plate in a stacking direction of the plates.

9. The method for producing liquid droplet ejection head as claimed in claim 7, wherein the etching of the flow path member plate in the first forming step is simultaneously performed with the etching of the protection member plate in the second forming step.

10. The method for producing liquid droplet ejection head as claimed in claim 7, wherein the damper portion in the first forming step comprises a thin portion formed by reducing a thickness of the nozzle plate.

11. The method for producing liquid droplet ejection head as claimed in claim 7, wherein the thin portion in the first forming step is independently disposed so as to correspond to at least one of the nozzles.

12. The method for producing liquid droplet ejection head as claimed in claim 7, wherein the thin portion in the first forming step is formed by performing laser processing, and the laser processing on the thin portion in the first forming step is simultaneously performed with the laser processing on the nozzles in the third forming step.

13. The method for producing liquid droplet ejection head as claimed in claim 12, wherein the laser processing on the thin portion in the first forming step, and the laser processing on the nozzles in the third forming step are performed by using a mask, wherein the mask comprises:

thin portion openings of n or less; and nozzle openings of from 2 to n, provided that n is a natural number.

* * * * *